(12) United States Patent
Luther et al.

(10) Patent No.: US 8,132,971 B2
(45) Date of Patent: Mar. 13, 2012

(54) METHODS FOR CENTERING OPTICAL FIBERS INSIDE A CONNECTOR FERRULE AND OPTICAL FIBER CONNECTOR

(75) Inventors: James P. Luther, Hickory, NC (US); Darrin M. Miller, Conover, NC (US)

(73) Assignee: Corning Cable Systems LLC, Hickory, NC (US)

( * ) Notice: Subject to any disclaimer, the term of this patent is extended or adjusted under 35 U.S.C. 154(b) by 441 days.

(21) Appl. No.: 12/241,558

(22) Filed: Sep. 30, 2008

(65) Prior Publication Data

US 2010/0080511 A1    Apr. 1, 2010

(51) Int. Cl.
| G02B 6/26 | (2006.01) |
| G02B 6/36 | (2006.01) |
| G02B 6/38 | (2006.01) |
| G02B 6/42 | (2006.01) |
| G02B 6/255 | (2006.01) |

(52) U.S. Cl. ................ 385/83; 385/52; 385/60; 385/72; 385/97

(58) Field of Classification Search .................... 385/52, 385/60, 72, 83, 97
See application file for complete search history.

(56) References Cited

U.S. PATENT DOCUMENTS

| 4,201,444 A * | 5/1980 | McCartney et al. ............ 385/64 |
| 5,185,836 A * | 2/1993 | Baker ............................. 385/61 |
| 2009/0297099 A1 * | 12/2009 | Benjamin et al. ............... 385/32 |

* cited by examiner

*Primary Examiner* — Ryan Lepisto
*Assistant Examiner* — Jerry Blevins
(74) *Attorney, Agent, or Firm* — Christopher Paul Lewallen

(57) ABSTRACT

Methods for centering at least one optical fiber (10) having a centerline (16) in a connector ferrule (100) having at least one bore (120) with a central axis ($A_C$) is disclosed. One method includes inserting a bare-fiber portion (13) into a ferrule bore so that at least a section (10S) of the bare-fiber portion extends beyond the ferrule front end (106). The method also includes selectively applying an amount of energy to the bare-fiber section to form a locally deformable region (19), and forming at a bulge (250) in the locally deformable region. The method also includes causing the bulge to form a force-fit with the bore at the ferrule front end, thereby substantially centering the optical fiber centerline along the bore central axis. Methods of centering nano-engineered optical fibers are also disclosed, wherein the optical fiber end is processed so that a substantially void-free fiber end (14) is made to substantially coincide with the ferrule front end. Methods directed to multiple optical fibers and multifiber ferrules are also disclosed.

25 Claims, 19 Drawing Sheets

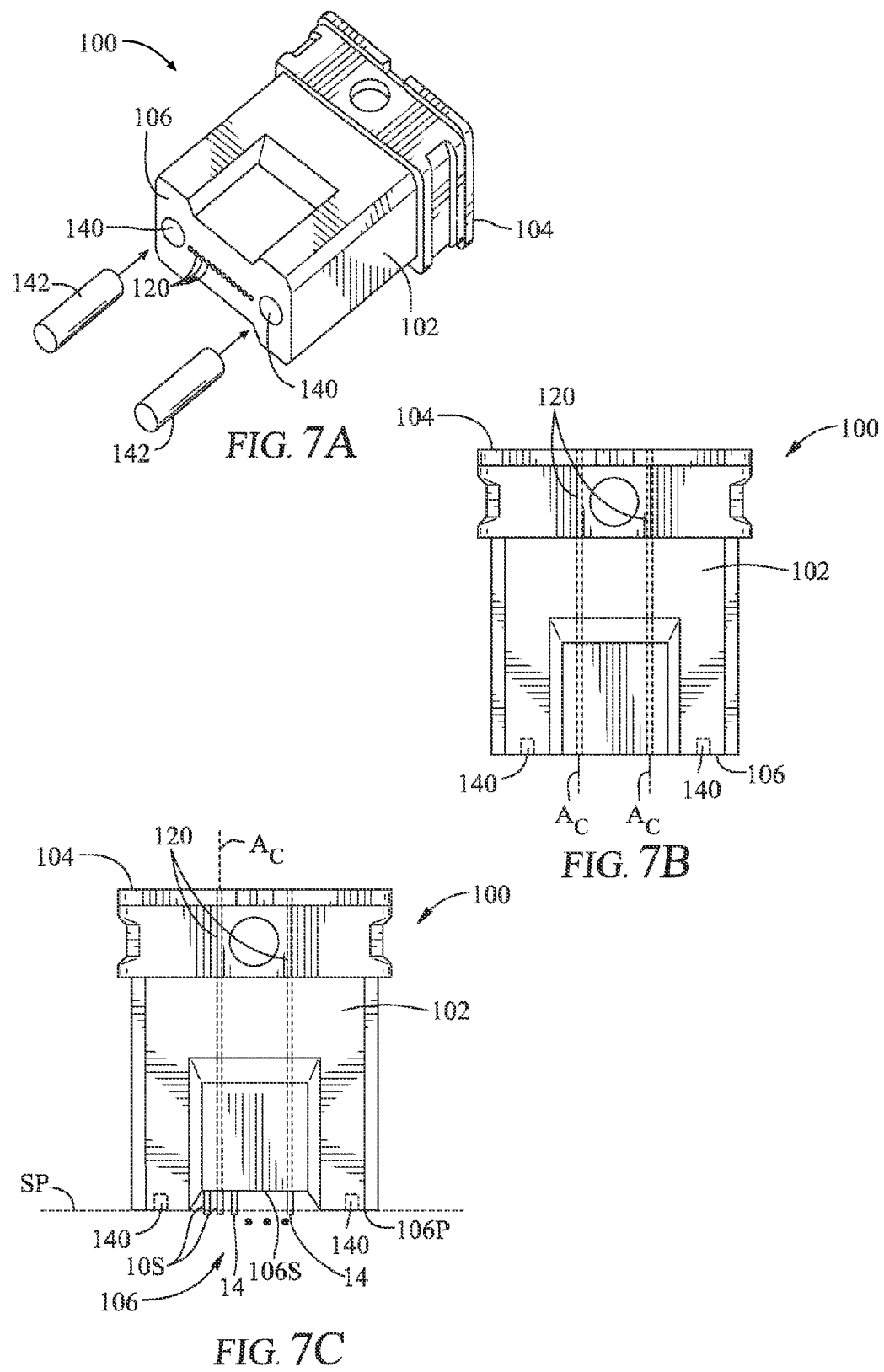

METHODS FOR CENTERING OPTICAL FIBERS INSIDE A CONNECTOR FERRULE AND OPTICAL FIBER CONNECTOR

CROSS-REFERENCE TO RELATED APPLICATIONS

This application is related to (a) U.S. patent application Ser. No. 11/595,365, entitled "Method of splicing an optical fiber with holes in the cladding," filed in the United States on Nov. 9, 2007; (b) U.S. patent application Ser. No. 12/077,694, entitled "Connectorized nano-engineered optical fibers and methods of forming same," filed in the United States on Mar. 20, 2008; and (c) U.S. patent application Ser. No. 12/220,266, entitled "Connectorized nano-engineered optical fibers and methods of forming same," filed in the United States on Jul. 23, 2008, all of which are incorporated by reference herein.

BACKGROUND OF THE INVENTION

1. Field of the Invention

The present invention relates generally to optical fibers and optical fiber connectors, and more specifically to methods for centering one or more optical fibers in an optical fiber connector ferrule.

2. Technical Background of the Invention

With the ever growing demand for lower loss fiber optic connections, the centering of one or more optical fibers in a ferrule of an optical fiber connector is becoming more and more critical. The ideal position of an optical fiber in a ferrule bore is the "dead center" of the ferrule bore—i.e., the optical fiber centerline is exactly aligned with the bore central axis. However, achieving such exact alignment has proven to be difficult. Also, with the introduction of bend insensitive fibers, it is preferred that the holes, voids or "airlines" within the optical fiber be closed off at the point where two fibers connect—namely, at or near the end of the ferrule—to prevent contaminants from gathering in the exposed airlines and adversely impacting the transmission of light between the connected optical fibers. The voids can include a gas such as Nitrogen or Krypton, or a mixture of such gases, such as air, Nitrogen, and/or Krypton.

One reason why centering one or more optical fibers in a single-fiber or multi-fiber connector ferrule is difficult is because it is not practical to use an interference fit between an optical fiber and a ferrule bore. Optical fibers can vary in size by up to ±1 micron or so, so that sizing a ferrule bore to have an interference fit with the optical fiber would result in significant amounts of optical fiber not fitting into the bore. In addition, those optical fibers that can barely be fit into the bore have a higher risk of being damaged due to the tight fit. In addition, an optical fiber is typically secured within the ferrule bore using an epoxy, so that some space within the bore must be maintained to accommodate the epoxy.

Once an optical fiber is exactly aligned in the ferrule bore, it must be locked into place. It is therefore important to have a simple and efficient way of maintaining the optical fiber in its centered position within the bore until the epoxy curing process or other fixing process can be carried out.

SUMMARY OF THE INVENTION

A first aspect of the invention is a method of centering at least one optical fiber having a centerline and an end, within at least one bore of a connector ferrule having a front end and a central axis. The method includes inserting at least one bare-fiber portion of the at least one optical fiber into the at least one ferrule bore so that a section of the at least one bare-fiber portion extends beyond the ferrule front end. The method also includes selectively applying an amount of energy to the at least one bare-fiber section so as to form a locally deformable region. The method further includes forming at least one bulge in the locally deformable region. The method also includes causing the at least one bulge to form a force-fit with the at least one bore at the ferrule front end, thereby substantially centering the at least one optical fiber centerline along the at least one bore central axis.

A second aspect of the invention is a method of centering at least one nano-engineered optical fiber within a connector ferrule having a front end and at least one bore with a central axis. The at least one nano-engineered optical fiber has a core, a cladding surrounding the core, and non-periodically disposed voids formed in the cladding. The method includes inserting at least one bare-fiber portion of the at least one optical fiber into the at least one ferrule bore so that at least a section of the at least one bare-fiber portion extends beyond the ferrule front end. The method also includes selectively heating the at least one bare-fiber section, thereby forming a locally deformable region and substantially collapsing the voids at least within the locally deformable region, thereby forming a substantially void-free region. The method further includes forming at least one bulge in the locally deformable region and force-fitting the at least one bulge with the at least one bore at the ferrule front end, thereby substantially centering the at least one optical fiber centerline along the at least one bore central axis. The method also optionally includes creating at least one end of the at least one optical fiber from the substantially void-free region so as to form a substantially void-free fiber end that substantially coincides with the ferrule front end (or in the case of a "long-short" multifiber ferrule, substantially coincides with the standoff plane).

A third aspect of the invention is a method of centering at least one optical fiber having a centerline in a connector ferrule having at least one bore with a central axis. The method includes inserting at least one bare-fiber portion of the at least one optical fiber into the at least one connector ferrule bore so that a section of the at least one bare-fiber portion extends beyond a front end of the ferrule. The method also includes locally heating a region of the at least one bare-fiber section, thereby forming at least one locally deformable region. The method further includes forming a bulge in the at least one locally deformable region, and force-fitting the bulge into the front end of the at least one ferrule bore so that the optical fiber centerline is substantially aligned with the bore central axis. The method further includes cleaving the at least one bare-fiber section to form at least one corresponding fiber end that substantially coincides with the ferrule front end. The cleaving can be performed using a laser, which can also simultaneously cleave and polish a fiber.

A fourth aspect of the invention is an optical fiber connector assembly with at least one ferrule, the ferrule having a front end at least one bore for receiving at least one optical fiber, and an optical fiber at least partially disposed in the bore. The portion of the at least one optical fiber is disposed in the at least one ferrule bore so that a section of the at least one fiber portion extends beyond the ferrule front end, and a section of the optical fiber comprises a bulge which has a size which is larger than the bare optical fiber diameter. The fiber at least partially contacts a surface of the ferrule bore, and the contact defines a fiber-to-ferrule interface region. The fiber-to-ferrule interface region comprises substantial contact between the bulge and a portion of the surface of the bore whereby movement of the fiber in the bore is inhibited and the fiber is aligned in relation to the bore.

Additional features and advantages of the invention are forth in the detailed description that follows, and in part will be readily apparent to those skilled in the art from that description or recognized by practicing the invention as described herein, including the detailed description that follows, the claims, and the appended drawings. It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof

BRIEF DESCRIPTION OF THE DRAWINGS

These and other features, aspects and advantages of the present invention are better understood when the following detailed description of the invention is read with reference to the accompanying drawings, in which:

FIG. 7A is a front perspective view of an MT-type multifiber ferrule;

FIG. 7B is a plan view of the MT-type multifiber ferrule of FIG. 7A;

FIG. 7C is similar to FIG. 7B, and illustrates an example embodiment of a "long-short" MT-type multifiber ferrule that facilitates laser processing of the fibers adjacent the ferrule front end;

DETAILED DESCRIPTION OF THE PREFERRED EMBODIMENTS

Reference is now made to preferred embodiments of the invention, examples of which are illustrated in the accompanying drawings. Whenever possible, the same or similar reference numbers and symbols are used throughout the drawings to refer to the same or similar parts.

In the description below, the term "void-free" in connection with an optical fiber means that there are no voids visible when the fiber end face is viewed at a magnification of 400× using an optical microscope. The smallest feature that is visible at such magnification is about 0.4 µm in diameter, so that any voids smaller than this size may be present, but would not be considered sufficiently large to be of significance in relation to the performance of the fiber. The term "substantially void free" means that there may be present voids having diameter of 0.4 μm or greater, but the number of voids (i.e., the air-fill percent) is so reduced as compared to that prior to thermally processing the fiber that they do not have a substantial impact on the performance of the fiber.

In an example embodiments of the invention as discussed below, reducing the number of voids (i.e., reducing the air-fill percent from its initial value) in a given fiber cross-section by a factor of 5 or greater is considered as forming a "substantially void free" fiber region. In other preferred embodiments, the initial air-fill percent is reduced by at least a factor of 50, and more preferably is reduced by at least a factor of 500 when forming the "substantially void-free region" of the fiber.

In example embodiment of the present invention, the fiber end face can have one or more voids, provided that the number of voids (i.e., the air-fill percent) is sufficiently small so that the potential for contamination of the fiber end face due to the presence of the one or more voids is insubstantial—e.g., has an insubstantial impact on the attenuation of light as it passes through the fiber end face. While having no voids at the fiber end face is generally preferred, allowing the fiber end face to have one or more voids but still be "substantially void free" allows for a larger process window for the methods described herein.

In some example embodiments, the substantially void-free region includes "void transition zones" between completely "void-free" portions and the void-containing portion of the optical fiber. The transition zones each include one or more voids (e.g., partially collapsed voids) and have a reduced air-fill percent as compared to the void-containing portion of the fiber, which is that portion of the fiber that remains unaffected by the localized heating of the mid-span portion of the fiber.

Figure 1:
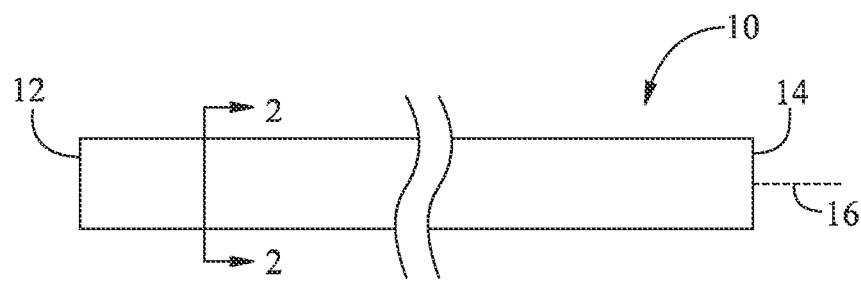
FIG. 1 is a side view of a section of an example optical fiber.

FIG. 1 is a side view of an example embodiment of a section of an optical fiber 10 having opposite ends 12 and 14, and a centerline 16. The methods of the present invention are particularly well suited to so-called "nano-engineered" fibers that include nano-engineered features in the form of relatively small aperiodically arranged voids that facilitate the guiding of optical-frequency electromagnetic waves in a glass fiber core in a manner that makes the optical fiber resistant to optical loss even when the fiber is bent to a small bending radius (i.e., the fiber is "bend resistant"). The nano-engineered optical fibers otherwise operate in the same manner as standard optical fibers. Nano-engineered optical fibers are discussed in detail below. Thus, in the discussion below "optical fiber 10" can refer to either a "standard" or "nano-engineered" optical fiber, or both, and one skilled in the art will understand whether a particular one of these two types of optical fibers is being considered based on the context of the discussion.

Nano-Engineered Optical Fibers

Nano-engineered optical fibers have voids limited to a relative small void-containing region in the fiber cladding wherein the air-fill percent (the area fraction of voids to the area of the optical fiber times 100%, at a pre-selected cross-section) is less than about 1% and is usually about 0.02% to about 0.2% or about 0.3%. The term "nano-engineered optical fiber" (also sometimes referred to as a "micro-structured" or "nanostructured" optical fiber) refers to an optical glass fiber comprising these nanometer-size features.

Figure 2:
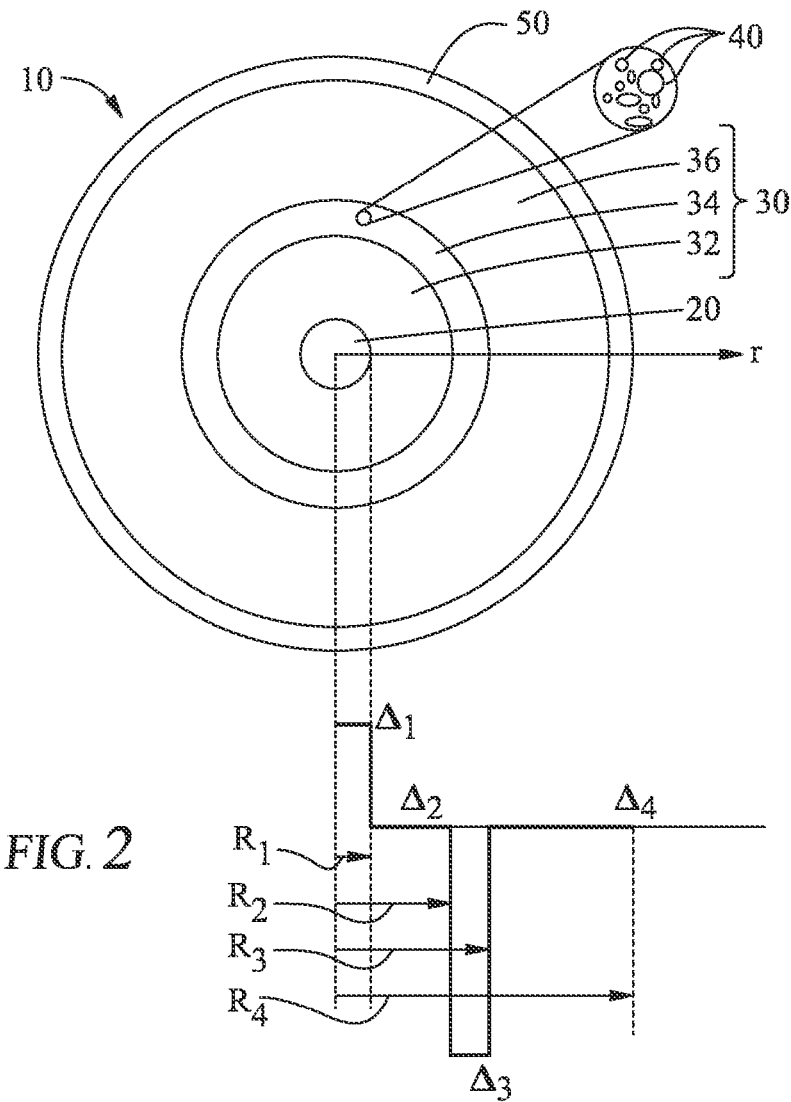
FIG. 2 is a cross-sectional view of an example optical fiber of FIG. 1 in the form of a nano-engineered optical fiber as viewed along 2-2 therein, along with an example effective refractive index profile for the various fiber regions.

FIG. 2 is a cross-sectional view of an example nano-engineered version of optical fiber 10 of FIG. 1 as viewed along the direction 2-2 of FIG. 1. Nano-engineered optical fiber 10 includes a core region ("core") 20 made up of a single core segment having a radius $R_1$ and positive maximum relative refractive index $\Delta_1$, a cladding region ("cladding") 30 having an annular inner cladding region ("inner cladding") 32 with an inner radius $R_1$, an outer radius $R_2$ an annular width $W_{12}$ and a relative refractive index $\Delta_2$. Optical fiber 10 also includes annular nano-engineered or "void containing" region 34 having an inner radius $R_2$, an outer radius $R_3$ an annular width $W_{23}$ and a relative refractive index $\Delta_3$. Optical fiber 10 also includes an outer annular cladding region ("outer cladding") 36 having an inner radius $R_3$, an outer radius $R_4$, an annular width $W_{34}$ and a relative refractive index $\Delta_4$. Outer annular cladding 36 represents the outermost silica-based portion of nano-engineered optical fiber 10. The total diameter of the "bare" fiber 10 is $D_{10}=2R_4$.

In an example embodiment $D_{10}=125$ microns (μm), $\Delta_1=$approximately 0.34%, $R_1=$approximately 4.5 microns, $R_2=$approximately 10.7 microns, region 34 is comprised of 100 holes having a mean diameter of approximately 300 nm and a maximum diameter of <700 nm, $W_{23}=$approximately 4 microns and $\Delta_2=\Delta_4=$approximately 0%.

In another example embodiment $D_{10}=125$ microns, $\Delta_1=$approximately 0.34%, $R_1=$approximately 4.5 microns, $R_2=$approximately 13.6 microns, region 34 is comprised of 200 holes having a mean diameter of approximately 200 nm and a maximum diameter of <700 nm, $W_{23}=$approximately 3 microns and $\Delta_2=\Delta_4=$approximately 0%.

In yet another example embodiment $D_{10}=125$ microns, $\Delta_1=$approximately 0.34%, $R_1=$approximately 4.5 microns, $R_2=$approximately 13.6 microns, region 34 is comprised of 400 holes having a mean diameter of approximately 150 nm and a maximum diameter of <700 nm, $W_{23}=$approximately 3 microns and $\Delta_2=\Delta_4=$approximately 0%.

In yet another example embodiment $D_{10}=125$ microns, $\Delta_1=$approximately 0.34%, $R_1=$approximately 4.5 microns, $R_2=$approximately 12.2 microns, region 34 is comprised of 500 holes having a mean diameter of approximately 120 nm and a maximum diameter of <700 nm, $W_{23}=$approximately 3 microns and $\Delta_2=\Delta_4=$approximately 0%. These fibers when measured by cable cutoff show that they are single-moded above 1260 nm.

A protective cover 50 is shown surrounding outer annular cladding 36. In an example embodiment, protective cover 50 includes one or more polymer or plastic-based layers or coatings, such as a buffer coating or buffer layer. Protective cover 50 is thus also referred to below as "buffer layer" 50.

In an example embodiment, annular void-containing region 34 is comprised of periodically or non-periodically disposed holes or "voids" 40 that run substantially parallel to centerline 16 and that are configured such that the optical fiber is capable of single mode transmission at one or more wavelengths in one or more operating wavelength ranges. By "non-periodically disposed" or "non-periodic distribution," it will be understood to mean that when one takes a cross-section (such as a cross-section perpendicular to the longitudinal axis) of the optical fiber, the non-periodically disposed voids are randomly or non-periodically distributed across a portion of the fiber. Similar cross sections taken at different points along the length of the fiber will reveal different cross-sectional void patterns, i.e., various cross-sections will have different void patterns, wherein the distributions of voids and sizes of voids do not match. That is, the voids are non-periodic, i.e., they are not periodically disposed within the fiber structure. These voids are stretched (elongated) along the length (i.e. in a direction generally parallel to centerline 16) of the optical fiber, but do not extend the entire length of the entire fiber for typical lengths of transmission fiber. Typically, voids 40 extend less than 10 meters, e.g., 0.2 to 1 meter or less.

As mentioned above, the nano-engineered optical fibers 10 suitable for use in example embodiments of the present invention preferably include an air-fill percent less than about 1%, more preferably less than about 0.7%, even more preferably less than about 0.3%, and even more preferably between about 0.02% and about 0.2%.

An example nano-engineered optical fiber 10 suitable for use in the present invention further has an average hole size of about 0.3 microns or less, such as 0.15 or 0.09 microns and greater than 0.005 microns. In contrast, holey fiber available from NTT, Japan, has an average hole size of about 12 microns and an air-fill percent of >1%, and typical photonic crystal fibers have air-fill percents >5%. Thus, as mentioned above, it is the small void size of the nano-engineered optical fibers considered herein that allows the fibers to retain their circularity and nominally their original size when the voids are substantially collapsed. Note that the above-mentioned air-fill percentages are considered "initial" air-fill percentages since voids 40 are substantially collapsed to form a "substantially void-free region" in one or more nano-engineered optical fibers 10, as described below.

For a variety of applications, it is desirable for the voids 40 of the nano-engineered optical fibers 10 considered herein to have greater than about 95% of and preferably all of the voids exhibit a mean void size in cladding 30 for the optical fiber that is less than 1550 nm, more preferably less than 775 nm, most preferably less than 390 nm and in some embodiments less than 250 nm and greater than 5 nm. Likewise, it is preferable that the maximum diameter of the voids in the fiber be less than 7000 nm, more preferably less than 4000 nm, more preferably less than 1550 nm, and most preferably less than 775 nm and in some embodiments less than 300 nm. In some embodiments, the fibers disclosed herein have greater than 50 voids, in some embodiments also greater than 200 voids, and in other embodiments the total number of voids is greater than 500 voids, while still in other embodiments the total number of voids is greater than 1000 voids in a given optical fiber perpendicular cross-section. Of course, the most preferred fibers will exhibit combinations of these characteristics.

Thus, for example, an embodiment of optical fiber 10 would exhibit greater than about 200 voids in the optical fiber, the voids having a maximum diameter less than 1550 nm and a mean diameter less than 775 nm, for example, the maximum diameter is less than 775 nm and the mean diameter of about 200 nm, although useful and bend resistant optical fibers can be achieved using larger and greater numbers of voids. The number of voids, mean diameter, max diameter, and total void area percent of voids can all be calculated with the help of an optical microscope at 400× or a scanning electron microscope at a magnification of about 800× and image analysis software, such as ImagePro, which is available from Media Cybernetics, Inc. of Silver Spring, Md., USA.

Because example nano-engineered optical fibers 10 considered herein rely on the core-cladding index difference to guide light, the fiber can generally include germania or fluorine to also adjust the refractive index of the core and/or cladding of the optical fiber, but these dopants can also be avoided in the intermediate annular region. The voids 40 (in combination with any gas or gases that may be disposed within the voids) can be used to adjust the manner in which light is guided down the core of the fiber, particularly when the fiber is bent. Void-containing region 34 may consist of undoped (pure) silica, thereby completely avoiding the use of any dopants in the void-containing region, to achieve a decreased refractive index, or the void-containing region may comprise doped silica, e.g. fluorine-doped silica having a plurality of voids.

In one set of embodiments, the core region 20 includes doped silica to provide a positive refractive index relative to pure silica, e.g. germania doped silica. The core region 20 is preferably free of voids 40.

Such a nano-engineered optical fiber 10 can be made to exhibit a single-mode behavior with a cable cutoff of less than 1400 nm, more preferably less than 1260 nm; a 20 mm diameter macrobend induced loss at 1550 nm of less than 1 dB/turn, preferably less than 0.5 dB/turn, even more preferably less than 0.1 dB/turn, still more preferably less than 0.05 dB/turn, yet more preferably less than 0.03 dB/turn, and even still more preferably less than 0.02 dB/turn; a 10 mm diameter macrobend induced loss at 1550 nm of less than 5 dB/turn, preferably less than 1 dB/turn, more preferably less than 0.5 dB/turn, even more preferably less than 0.2 dB/turn, still more preferably less than 0.01 dB/turn, still even more preferably less than 0.05 dB/turn.

Example nano-engineered optical fibers 10 considered herein also include multi-mode nano-engineered optical fibers that comprise, for example, a graded-index core region and a cladding region surrounding and directly adjacent to the core region, the cladding region comprising a depressed-index annular portion comprising a depressed relative refractive index, relative to another portion of the cladding (which preferably is silica that is not doped with an index of refraction altering dopant such as germania or fluorine). Preferably, the refractive index profile of the core has a parabolic shape. The depressed-index annular region 34 may comprise glass comprising a plurality of voids 40, fluorine-doped glass, or fluorine-doped glass comprising a plurality of voids. The depressed index region 34 can be adjacent to or spaced apart from the core region.

Example multi-mode nano-engineered optical fibers 10 considered herein also exhibit very low bend induced attenuation, in particular very low macrobending attenuation. In some embodiments, high-bandwidth is provided by a low maximum relative refractive index in the core, and low bend losses are also provided. In some embodiments, the core radius is large (e.g. greater than 10 microns, for example 25 microns and 31.25 microns), the core refractive index is approximately 2% or less (e.g. 2.0%, 1.0%, 0.90% or 0.50%), and the macrobend losses are low. Preferably, the multi-mode nano-engineered optical fiber 10 disclosed herein exhibits a spectral attenuation of less than 3 dB/km at 850 nm.

In an example embodiment, core 20 and cladding 30 are configured to provide improved bend resistance, and single-mode operation at wavelengths preferably greater than or equal to 1500 nm, in some embodiments also greater than about 1310 nm, in other embodiments also greater than 1260 nm. Example embodiments of the nano-engineered optical fibers 10 considered herein provide a MFD at a wavelength of 1310 nm preferably greater than 8.0 microns, more preferably between about 8.0 and 10.0 microns.

Example Effective Index Parameters

In one set of example embodiments, a single-mode nano-engineered optical fiber 10 has the following parameters: $0.30\% < \Delta_1 < 0.40\%$, and $3.0\,\mu m < R_1 < 5.0\,\mu m$. In some embodiments, core 20 has a refractive index profile with an alpha shape, where in some embodiments alpha is 6 or more, while in other embodiments alpha is 8 or more. An example embodiment of a multi-mode nano-engineered optical fiber 10 has the following parameter range: $12.5\,\mu m \leq R_1 \leq 40$ microns. In some embodiments, $25\,\mu m \leq R_1 \leq 32.5\,\mu m$, and in some of these embodiments, $R_1$ is greater than or equal to about 25 microns and less than or equal to about 31.25 microns.

In an example embodiment, core 20 preferably has a maximum relative refractive index (sometimes called $\Delta_{1MAX}$) of $0.5\% \leq \Delta_1 \leq 2.0\%$. In yet another embodiment, core 20 has a maximum relative refractive index $0.9\% \leq \Delta_1 \leq 1.1\%$. In yet another embodiment, core 20 has a maximum relative refractive index $0.4\% \leq \Delta_1 \leq 0.5\%$. Such multi-mode nano-engineered optical fibers 10 preferably exhibit a one-turn 10 mm diameter mandrel attenuation increase of no more than a 1 turn 10 mm diameter mandrel wrap attenuation increase at a wavelength of 1550 nm, in dB, (also called 1×10 mm dia. bend loss at 1550 nm) of less than or equal to the product of two times $(1/\Delta_{1MAX})^2$. Thus for a multi-mode nano-engineered optical fiber 10 having a core $\Delta_{1MAX}$ of 2% the 1×10 mm dia. bend loss at 1550 nm $\leq 2(1/2)^2 = 1$ dB; for a multi-mode fiber having a core $\Delta_{1MAX}$ of 1% the 1×10 mm dia. bend loss at 1550 nm $\leq 2(1/1)^2 = 1$ dB; and for a multi-mode nano-engineered optical fiber 10 having a core $\Delta_{1MAX}$ of 0.5% the 1×10 mm dia. bend loss at 1550 nm $\leq 2(1/0.5)^2 = 4$ dB.

In an example embodiment, the void-containing region 34 has an inner radius $R_2 \leq 20$ µm. In some example embodiments, $10~\mu m \leq R_2 \leq 20$ µm. In other embodiments, $10~\mu m \leq R_2 \leq 18$ µm. In other embodiments, $10~\mu m \leq R_2 \leq 14$ µm. In some embodiments, the inner annular cladding radial width $W_{12} > 1$ µm. In an example embodiment, radius $R_2 > 5$ µm, and more preferably $R_2 > 6$ µm.

Again, while not being limited to any particular width, in an example embodiment, the void-containing region 34 has a radial width $0.5~\mu m \leq W_{23}$, while in other example embodiments $0.5~\mu m \leq W_{23} \leq 20$ µm. In other embodiments, $2~\mu m \leq W_{23} \leq 12$ µm. In other embodiments, $2~\mu m \leq W_{23} \leq 10$ µm. In an example embodiment, the annular void-containing region 34 has a regional void area percent of less than about 30 percent and greater than 0.5 percent, and the non-periodically disposed voids 40 have a mean diameter of less than 1550 nm. In some embodiments, void-containing region 34 has a regional void area percent of less than about 10% and greater than 0.5% and a mean void diameter of less than 775 nm and greater than 5 nm. In some embodiments region 34 has a regional void area percent of less than about 6% and greater than 0.5% and a mean void diameter of less than 300 nm and greater than 5 nm.

Multimode nano-engineered optical fibers 10 are discussed in U.S. patent application Ser. No. 12/004174, entitled "Bend-resistant multimode optical fiber," filed on Dec. 20, 2007, and incorporated by reference herein. The bandwidth of the multi-mode version of nano-engineered optical fiber 10 varies inversely with the square of $\Delta_{1MAX}$. For example, a multi-mode nano-engineered optical fiber 10 with $\Delta_{1MAX} = 0.5\%$ can yield a bandwidth 16 times greater than an otherwise identical multi-mode optical fiber 10 with $\Delta_{1MAX} = 2.0\%$.

Ferrule Types

The methods of the present invention apply to both single-fiber connector ferrules and multifiber connector ferrules. Examples of these two types of ferrules are discussed below, and then example methods of centering at least one optical fiber 10 therein are set forth. Some of the example methods are applied to one or more nano-engineered optical fibers, and the methods as applied to such fibers include substantially collapsing voids 40 so as to form substantially void-free fiber ends 14.

Single-Fiber Ferrule

Figure 3:
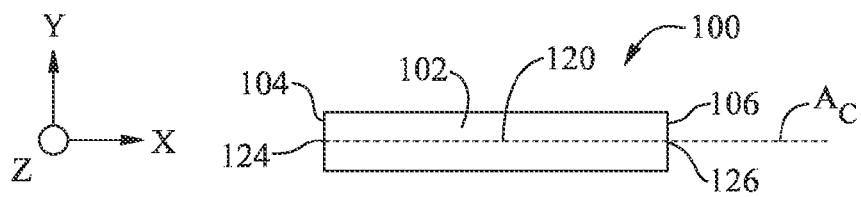
FIG. 3 is a schematic side view of an example single-fiber ferrule.
Figure 4:
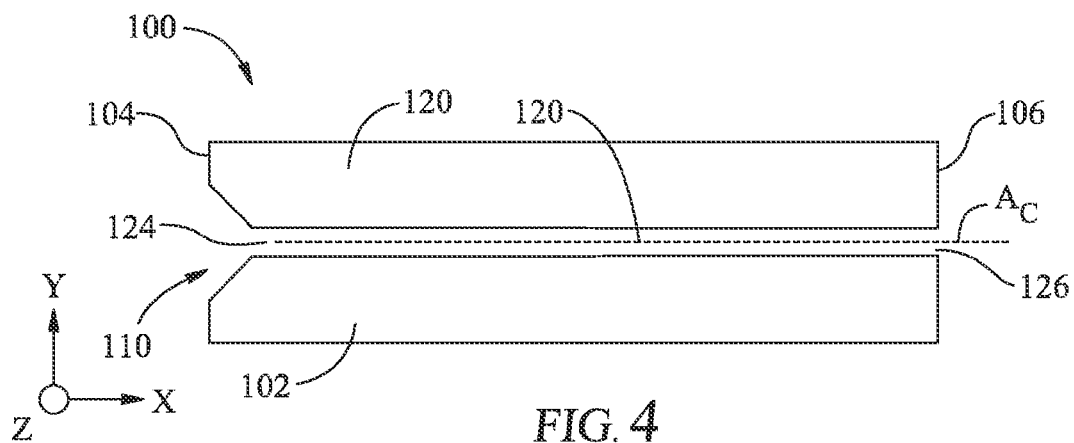
FIG. 4 is a length-wise cross-sectional view of the ferrule of FIG. 3.
Figure 5:
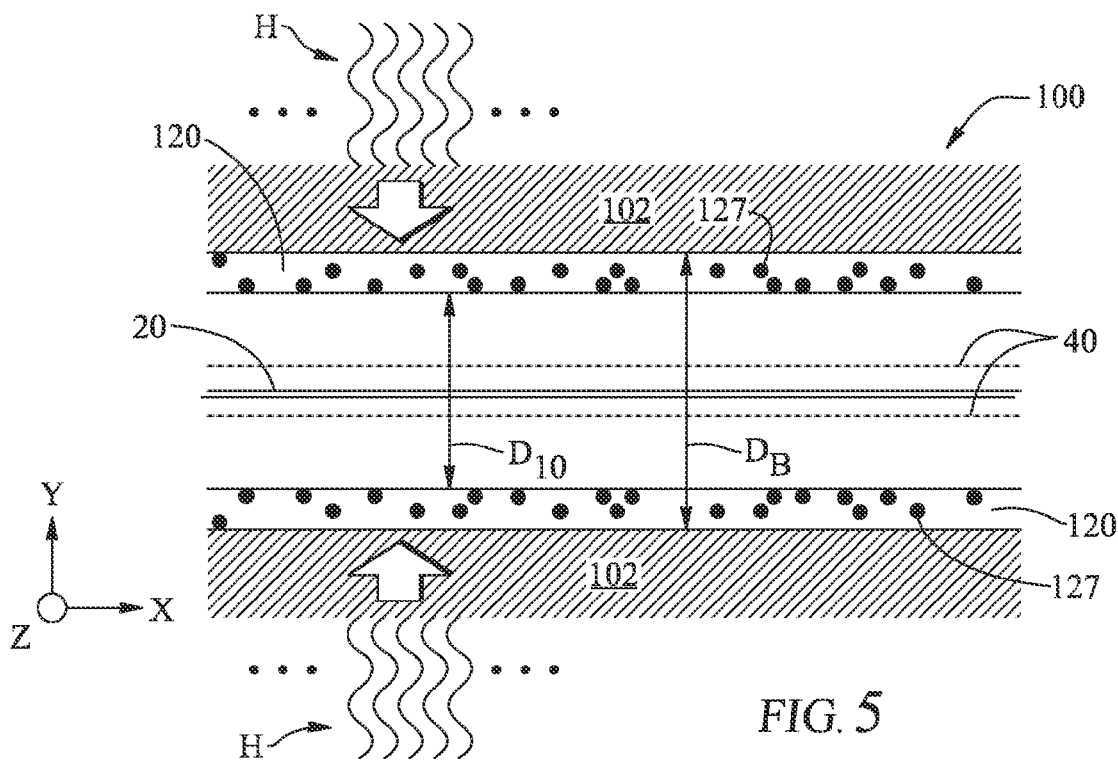
FIG. 5 is a close-up view of a portion of the ferrule of FIG. 4 and that includes an optical fiber contained therein.

FIG. 3 is a schematic side view of an example single-fiber ferrule 100. FIG. 4 is a length-wise cross-sectional view of ferrule 100, and FIG. 5 is a close-up view of a portion of ferrule 100 of FIG. 4 and that includes a nano-engineered optical fiber 10. Cartesian X-Y-Z coordinates are shown in FIG. 3 through FIG. 5 for the sake of reference.

Ferrule 100 includes a cylindrical ferrule body 102 having a substantially circular cross-section and that extends lengthwise along a central axis $A_C$. An example material for ferrule body 102 is ceramic. Ferrule body 102 includes opposite first and second ends 104 and 106. First (rear) end 104 optionally includes a conical notch 110 centered on central axis $A_C$, while second (front) end 106 is preferably planar or includes a planer portion that defines a front end face.

Ferrule body 102 defines a single central bore 120 having respective rear and front open ends 124 and 126 at rear and front ends 104 and 106. Bore 120 is centered on central axis $A_C$ and has a diameter $D_B$. In an example embodiment where ferrule 100 is to be used with an optical fiber 10 having a diameter $D_{10}$ that is nominally 125 µm, the bore diameter $D_B$ is nominally 125.7 µm. Voids 40 are shown in FIG. 5 as dashed lines surrounding fiber core 20 to indicate the case where optical fiber 10 is a nano-engineered optical fiber. FIG. 5 also shows an epoxy 127, such as a heat-activated epoxy, within bore 120. As discussed below, epoxy 127 serves to fix optical fiber 10 to ferrule body 102 after the optical fiber is substantially centered in bore 120.

Figure 6A:
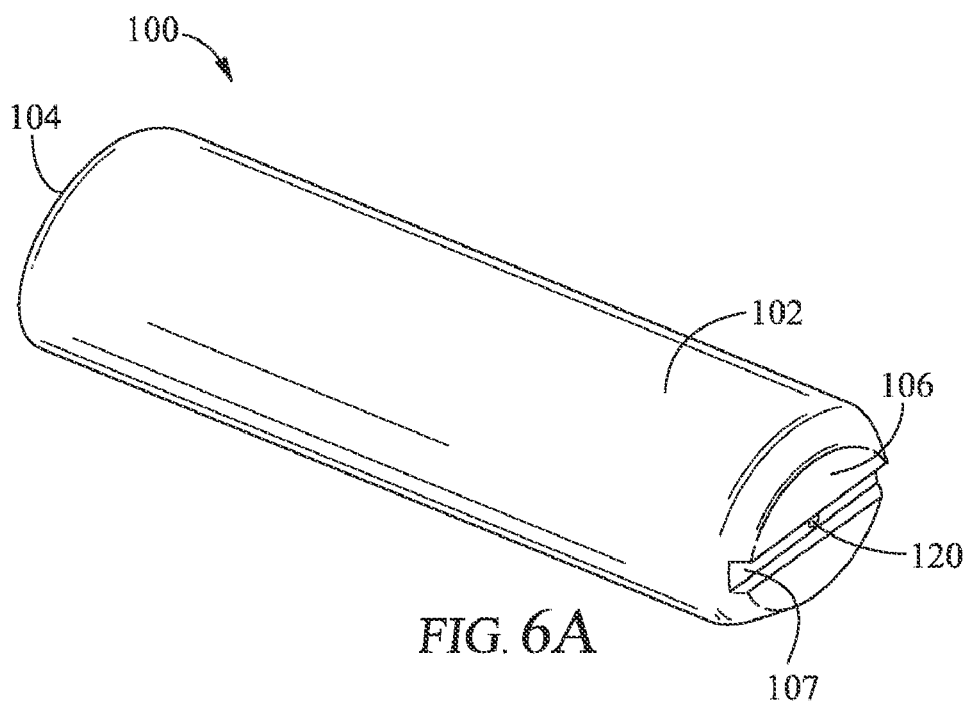
FIG. 6A is a perspective view of an example "long-short" single-fiber ferrule that facilitates laser processing of the fiber adjacent the ferrule front end.
Figure 6B:
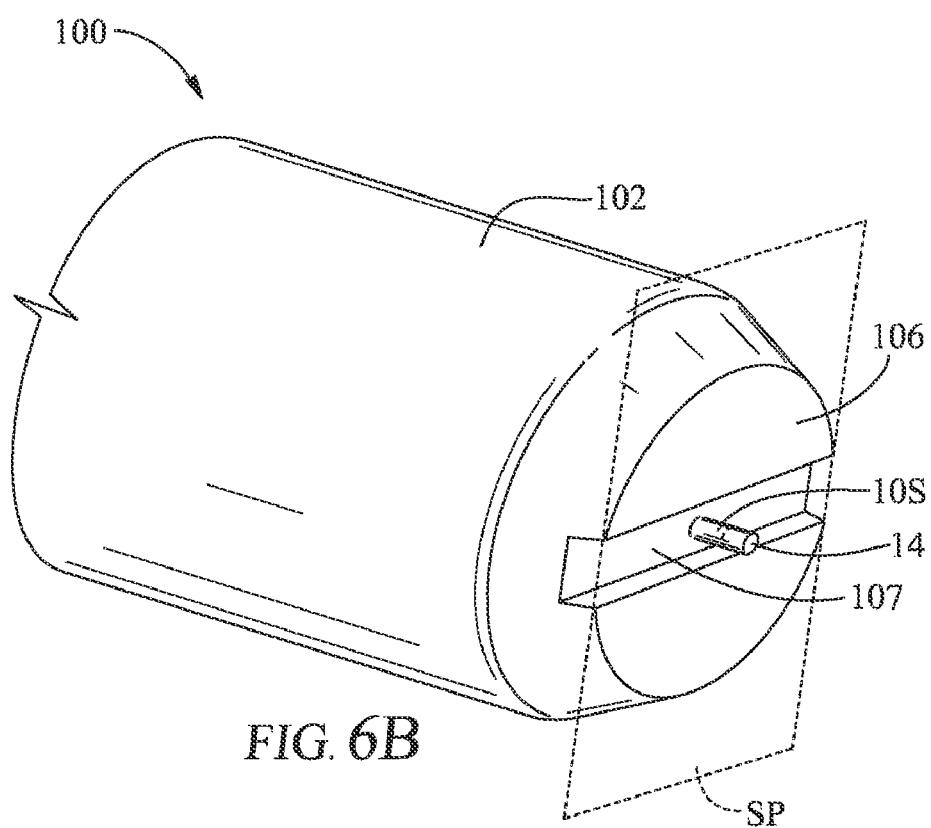
FIG. 6B is a close-up perspective view of the notched front end of the "long-short" single-fiber ferrule of FIG. 6A.

FIG. 6A is a perspective view of an example single-fiber ferrule 100, while FIG. 6B is a close-up perspective view of rear end 104 of the ferrule of FIG. 6A. The single-fiber ferrule of FIGS. 6A and 6B includes at front end 106 a notch 107 that runs across ferrule body 102 and through central axis $A_C$. Notch 107 facilitates the laser processing (e.g., cleaving, polishing or simultaneous cleaving and polishing) of fiber section 10S that extends from bore 120 at front end 106. Specifically, notch 107 allows for the laser beam to process fiber section 10S far enough away from ferrule body 100 to prevent damaging the ferrule body. Moreover, front end 106 serves as the standoff surface (which defines a standoff plane SP), so that the length of fiber section 10S extending beyond the plane of front end 106 is significantly shorter than that which actually extends from bore 120. This type of ferrule is thus referred to in the art as a "long-short" (LS) ferrule.

Multi-Fiber Ferrule

FIG. 7A is a perspective view and FIG. 7B is a plan view of an MT-type multifiber ferrule 100 having a ferrule body 102 that is generally rectangular in lateral cross-section. An example material for multifiber ferrule body 102 is plastic. Although an MT-style ferrule is illustrated and described herein in certain example embodiments, multifiber ferrule 100 need not be an MT-type ferrule and may be any other type of multifiber ferrule. Multifiber ferrule 100 may be, for example, of the type used for connectors such as SC/APC, SC/UPC, FC/APC, FC/UPC, LC/APC, and LC/UPC connectors. Ferrule body 102 defines a plurality of bores 120 each having rear and front open ends 124 and 126 at respective ferrule rear and front ends 104 and 106. Bores 120 are arranged in a laterally extending linear row along respective central axes $A_C$ for receiving the bare-fiber portions of respective optical fibers 10.

Although the embodiments of the multifiber ferrule 100 illustrated herein define a total of twelve bores 120 such that the multifiber ferrule 100 can support twelve individual optical fibers 10, the multifiber ferrule may define any number of bores, such as 2, 4, 6, 8, 10 or more. In addition, the multifiber ferrule 100 may comprise more than a single linear row of bores 120, such as two rows of 12 bores. Furthermore, bores 120 need not be arranged in one or more laterally extending linear rows. For example, any number of bores 120 may be arranged in any predetermined pattern. Like the single-fiber ferrule 100, the multifiber ferrule bores 120 each have a diameter $D_B$ slightly larger than the nominal fiber diameter $D_{10}$ for the optical fibers 10 intended for use with the multifiber ferrule.

The ferrule body 102 may also define at least one and elongate guide pin hole 140 (FIG. 7A) also referred to in the art as an "alignment hole." Two guide pin holes 140 in front end 106 are shown in FIG. 7A. Guide pin holes 140 are adapted to receive respective guide pins 142 to align ferrule 100 with an opposing ferrule (not shown) of a mating connector (not shown) in a known manner.

FIG. 7C is a plan view of the front end 106 of an example "long-short" (LS) multifiber ferrule 100. Front end 106 of LS multifiber ferrule 100 includes outer protrusions 106P (e.g., pedestals) that extend out from the otherwise planar surface 106S of front end 106. Protrusions 106P serve as the standoff surface for front end 106 and define a standoff plane SP. Protrusions 106P allow fiber sections 10S to protrude from bores 120 over a "long" length from surface 106S and over a "short" length from standoff plane SP.

As in the case of the single-fiber LS ferrule discussed above, protrusions 106P allow for a laser beam to cleave (or simultaneously cleave and polish) fiber sections 10S at a safe distance from ferrule body 102. When LS multifiber connector 100 is mated to another connector, protrusions 106P serve as the standoff, so that the effective fiber length extending from the connector is the "short" length as measured relative to standoff plane SP. Fiber ends 14 can thus be formed to substantially coincide with standoff plane SP.

Single-Fiber and Multifiber Fiber-Centering Methods

Various example methods of centering at least one optical fiber 10 in a single-fiber or multifiber ferrule are now described for single-fiber and multiple-fiber ferrules. As discussed above, the methods of the present invention are applicable to both "standard" optical fibers and nano-engineered optical fibers. In some of the example embodiments below, the optical fibers 10 are nano-engineered optical fibers, and the methods include substantially collapsing the voids 40 to form a localized substantially void free region in the at least one fiber so as to form at least one substantially void-free fiber end 14.

Single-Fiber Embodiments

Figure 8:
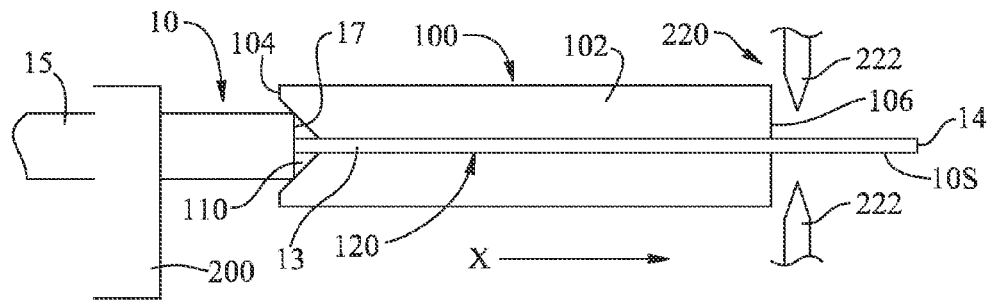
FIG. 8 is a schematic side view of single-fiber ferrule that holds an optical fiber.

FIG. 8 is a schematic side view of an single-fiber ferrule 100 that supports a single optical fiber 10, which in an example embodiment is a nano-engineered optical fiber. A bare-fiber portion 13 adjacent fiber end 14 of optical fiber 10 and that includes the fiber end has its protective coating ("buffer layer") 50 removed ("stripped") so that this portion can be inserted into bore 120. The remaining "buffered-fiber" portion 15 of optical fiber 10 is supported by a fiber holder 200 adjacent rear ferrule end 104. Buffered-fiber portion 15 and includes a "buffer edge" 17 where the buffered-fiber portion terminates at bare-fiber portion 13.

A pair 220 of opposing electrodes 222 is arranged adjacent ferrule front end 106 to provide localized heating of optical fiber 10 as described below. In an example embodiment, bore 120 is filled with an epoxy 127 (see FIG. 5) to fix optical fiber 10 to ferrule 100 once the fiber-centering procedure is completed.

Bare-fiber portion 13 is inserted into epoxy-containing ferrule bore 120 so that a bare-fiber section 10S of the bare-fiber portion extends from front ferrule end 106 and in between opposing electrodes 222. Optical fiber 10 is preferably held in a seated position at ferrule rear end 104 with buffer edge 17 placed up against rear ferrule end 104 so that there is no exposed bare fiber when the resultant ferrule assembly is incorporated into a connector.

Figure 9:
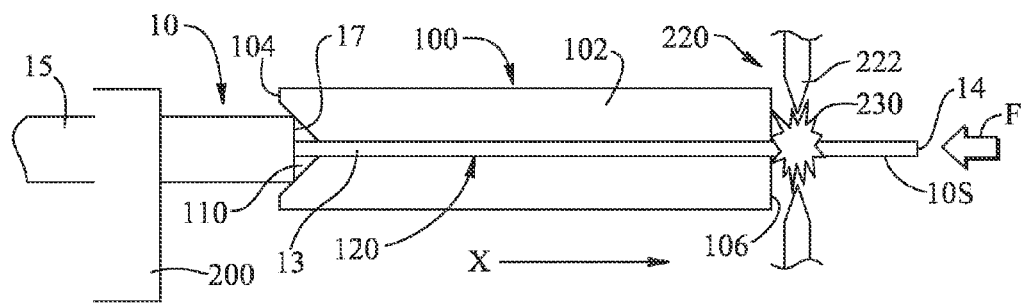
FIG. 9 is a schematic side view similar to FIG. 8, and illustrates the local heating of the optical fiber via an electrical arc for forming the locally deformable region.

With reference now to FIG. 9, a current is applied to opposing electrodes 222 so as to generate a high-temperature arc 230. The energy from arc 230 acts to locally soften optical fiber 10 to form a locally deformable region 19, introduced and described in greater detail below in connection with FIG. 11. In the case where optical fiber 10 is a nano-engineered optical fiber, the localized heating also acts to substantially collapse voids 40, thereby form a substantially void-free region 11, at least of portion of which is contained in locally deformable region 19.

Figure 10:
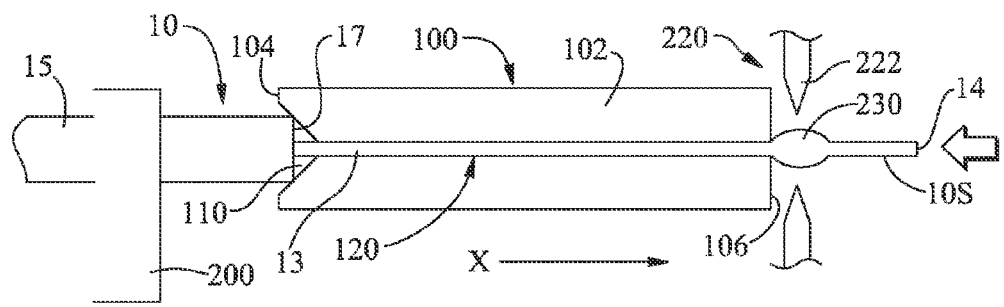
FIG. 10 is similar to FIG. 9, and illustrates the fiber bulge positioned to have an interference fit with the front end of the ferrule bore.

In an example embodiment, a small amount of an axial force F is applied to optical fiber 10 during the arcing process (or within a sufficiently short time thereafter) so that the locally deformable region deforms to form a bulge 250. The formation of bulge 250 also forms a fiber-to-ferrule interface region. The fiber-to-ferrule interface region includes positive contact between at least portions of the optical fiber and the surface of bore 120. Preferably, the contact between the fiber-to-ferrule interface region is substantial contact whereby movement of the fiber in the bore is inhibited. In another embodiment the fiber-to-ferrule contact region comprises a force fit of the optical fiber to at least portions of the bore 120 at front ferrule end 106, as illustrated in FIG. 10 and in the close-up view of FIG. 11.

In an example embodiment, surface tension effects caused by the localized heating cause an increase in the fiber diameter, thereby creating bulge 250. In an example embodiment, bulge 250 formed using surface tension effects has a size of about 25 μm to 50 μm larger than the normal fiber diameter $D_{10}$. The phrase "force fit" means the fiber is, through the use of force, assembled into the hole formed in the ferrule, which hole has a slightly smaller diameter than the bulge on the fiber. The fiber can be essentially permanently or temporarily force fit into the ferrule hole. The force fit is such that axial and radial movement of the fiber relative to the ferrule is, in one embodiment, inhibited, and in other embodiments substantially prevented. The force can be due to expansion of the fiber in the hole, and/or pushing or pulling of the bulge into the hole.

Figure 11:
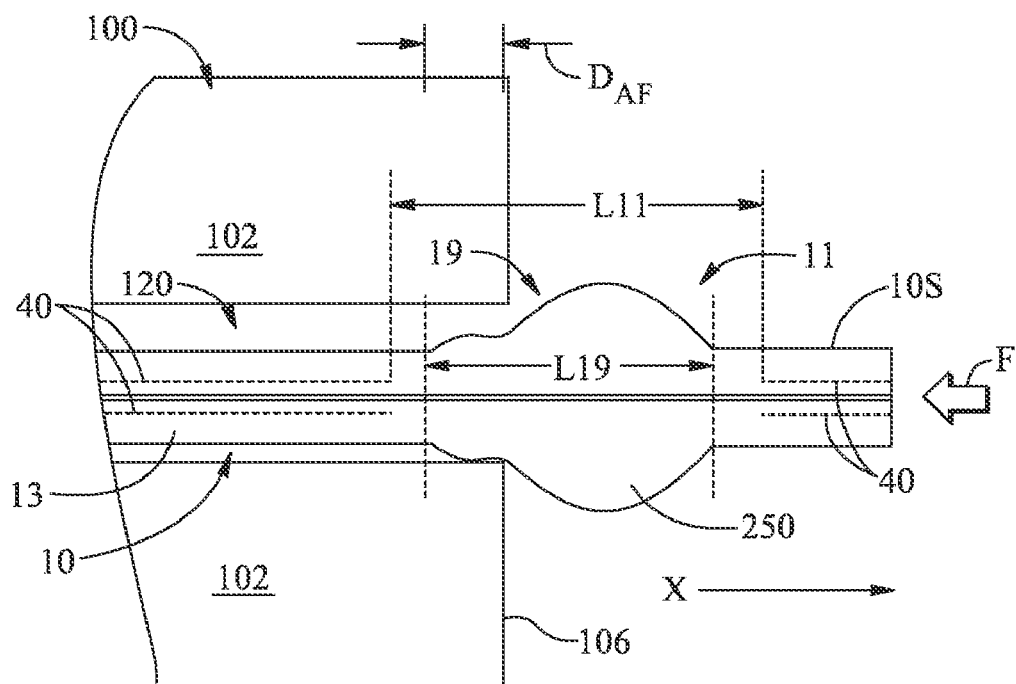
FIG. 11 is a close-up view of the ferrule front end as shown in FIG. 10, illustrating the interference fit of the fiber bulge with the front end of the ferrule bore, and showing the locally deformable region and the substantially void-free fiber region for the case of a nano-engineered optical fiber.

With reference to FIG. 11, locally deformable region 19 has a length L19, while the substantially void-free region has a length L11. The axial extents of these regions are indicated by respective dashed lines. Substantially void-free region 11 may extend beyond locally deformable region 19 because collapsing voids 40 does not necessarily require heating a nano-engineered optical fiber to the point of deformation.

In one example embodiment, axial force F is applied by generating pressure to fiber end 14 directed towards ferrule 100—i.e., by "pushing" on the optical fiber in the −X direction. In another example embodiment, axial force F is applied by "pulling" (i.e., by placing a load on) optical fiber 10 the −X direction.

Bulge 250 causes optical fiber 10 to be substantially centered in bore 120 along the bore central axis $A_C$, i.e., so that optical fiber centerline 16 is substantially aligned with the bore central axis. Furthermore, bulge 250 serves to tack optical fiber 10 within bore 120 at ferrule front end 106 and inhibits or prevents the optical fiber from being pulled out of ferrule 100.

In an example embodiment, arc 230 is preferably positioned close enough to ferrule front end 106 so as to not damage ferrule 100 but still provide enough energy in the form of heat to substantially collapse voids 40 close to the ferrule front end. In example embodiment, enough heat is generated by arc 230 to substantial collapse voids 40 to the extent that substantially void-free region 11 extends into ferrule bore 120 by at least a small distance $D_{AF}$.

In an example embodiment, fiber bulge 250 as formed for single-fiber and multiple fiber centering applications (the latter are discussed below) need only have a size such that it makes optical fiber diameter $D_{10}$ only slightly larger than bore diameter $D_B$. By way of example, for a fiber diameter $D_{10}$=125 μm (nominal), and a bore diameter $D_B$=125.7 μm, an increase in fiber diameter $D_{10}$ of about 1 μm, or to $D_{10}$=126 μm, is generally sufficient to carry out the centering methods of the present invention. This is a diameter change $\Delta D_{10}$=0.8%. In an example embodiment, the fiber diameter increase $\Delta D_{10}$ associated with bulge 250 is in the range defined by $0.8\% \leq \Delta D_{10} \leq 20\%$, is more preferably in the range defined by $0.8\% \leq \Delta D_{10} \leq 20\%$, and is more preferably in the range defined by $2\% \leq \Delta D_{10} \leq 5\%$. Thus, the relative size of bulges 250 as shown in the Figures for both the single-fiber embodiments and multifiber embodiments are exaggerated for the sake of illustration.

In an example embodiment, bulges 250 are formed so as not to substantially affect the waveguiding properties of one or more optical fibers 10, except for those properties associated with substantially collapsing the voids when the one or more optical fibers being considered are nano-engineered optical fibers.

Once optical fiber 10 is force-fitted into bore 120, the optical fiber is bonded to ferrule body 102, e.g., by applying heat H to the heat-activated epoxy 127 contained in bore 120, as shown in FIG. 5.

Figure 12:
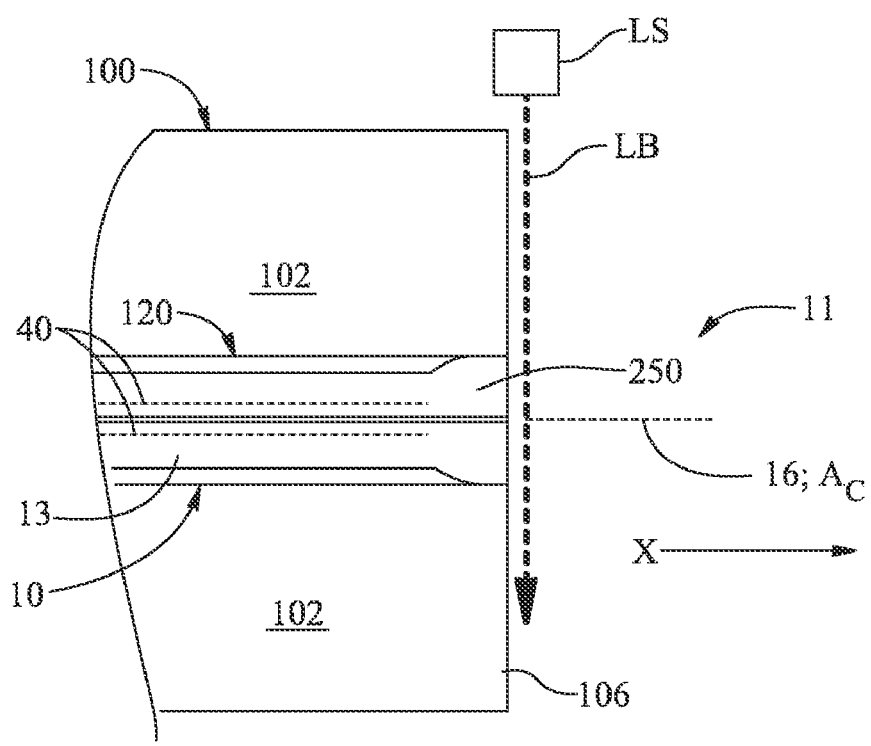
FIG. 12 is a close-up view of the ferrule front end similar to FIG. 11, illustrating the laser processing of the fiber end so that the fiber end substantially coincides with the ferrule front end.

With reference now to FIG. 12, at this point, bare-fiber section 10S that extends from ferrule front end 106 is cut (e.g., precision-cut or "cleaved") at or close to the ferrule front end and then polished so that resulting fiber end 14 substantially coincides with the ferrule front end. One or both of the cutting and polishing steps can be performed, for example, using either a laser beam LB from a laser source LS as shown in FIG. 12, or with a diamond scribe and conventional mechanical polishing techniques. In an example embodiment, laser beam LB simultaneously cleaves and polishes fiber end 14. Note that the laser cleaving and polishing process is facilitated by the use of the LS single-fiber ferrule 100 as discussed above in connection with FIGS. 6A and 6B.

In an example embodiment, electrode pair 220 is part of a fusion splicer configured to provide a select amount of current for a select duration. A suitable fusion splicer for use in carrying out the method of the present invention is, for example, the Corning miniMASS® Fusion Splicer, available from Corning Cable Systems, Inc., Hickory, N.C. An example amount of current for forming electric arc 230 is in the range of about 12 mA to about 16 mA for a single optical fiber 10. Larger amounts of current would be used for multiple fibers, such as fiber ribbons.

While localized heating of optical fiber 10 is described above using an electric arc 230 by way of example, the localized heating may be generated in various ways including using other means, such as a heated filament, a flame or a laser, among others.

If heat-activated epoxy 127 is contained in bore 120 prior to inserting bare portion 13 of optical fiber 10 therein, then it is important to perform the above steps in a manner that does not prematurely heat-activate the epoxy. In an example embodiment, bulge 250 is first formed far enough from the ferrule front end 106 so that the preinstalled epoxy 127 is not substantially affected, and then the bulge moved (e.g., "pulled" or "pushed") into bore 120 at ferrule front end 106.

In an alternative example embodiment, epoxy 127 is added to bore 120 after heat treating optical fiber 10 with arc 230. This is accomplished, for example, by wicking epoxy 127 into bore 120. In an example embodiment, the wicking action of epoxy 127 is assisted by heating the ferrule and/or by applying a vacuum to pull the epoxy into bore 120.

Figure 13:
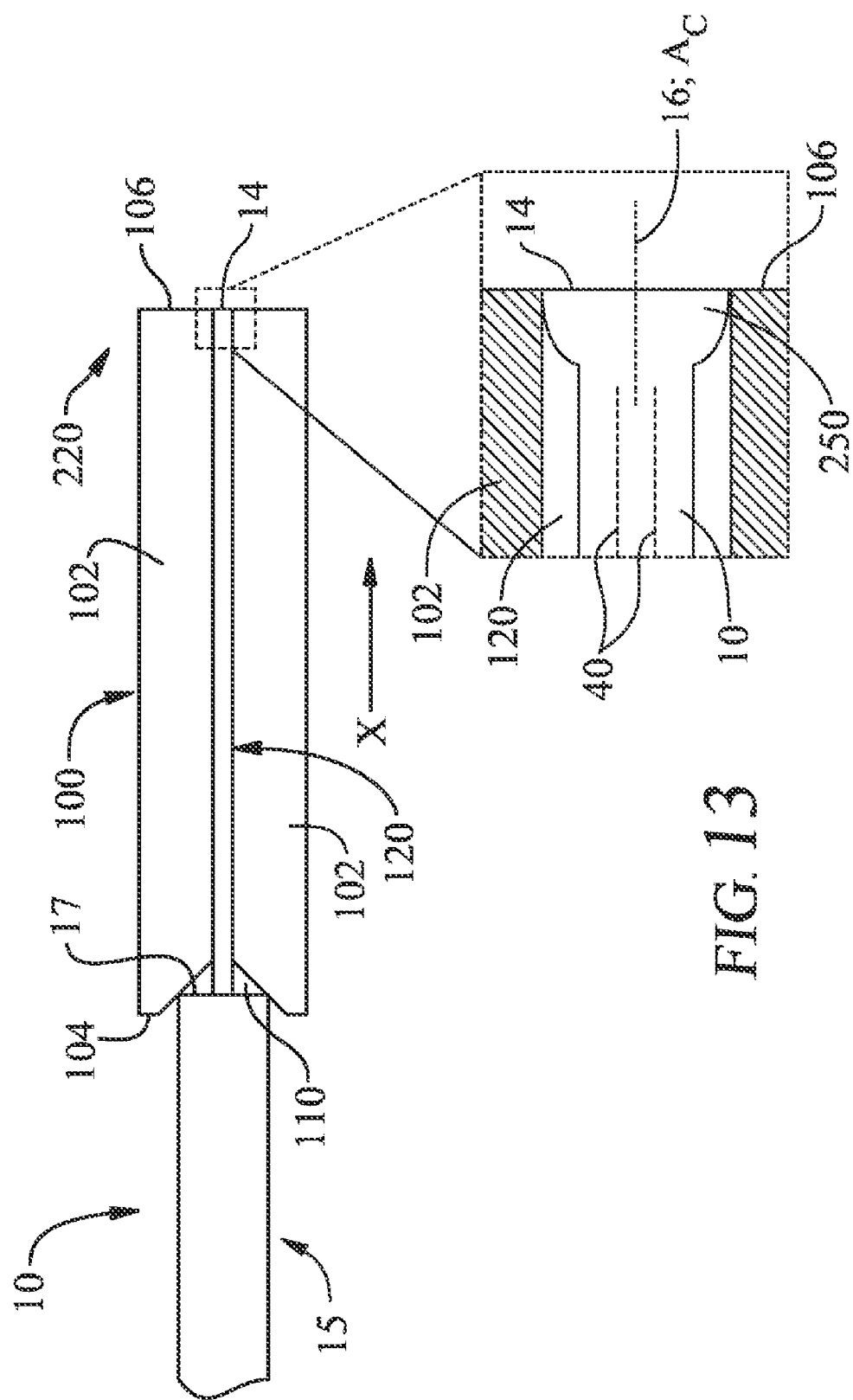
FIG. 13 is a schematic side view similar to FIG. 8, showing an example finalized single-fiber ferrule assembly along with a close-up inset view of the substantially void-free fiber end in the case where a nano-engineered optical fiber is used.

The above steps form an example ferrule assembly 101, wherein optical fiber end 14 is substantially coincident with front ferrule end 106 (e.g., is polished to be flush therewith), as shown in FIG. 13. In the case where optical fiber 10 is a nano-engineered optical fiber, fiber end 14 has substantially no voids. In an example embodiment where the single-fiber ferrule 100 is an LS-type ferrule, fiber end 14 is formed substantially coincident with standoff plane SP.

Figure 14:
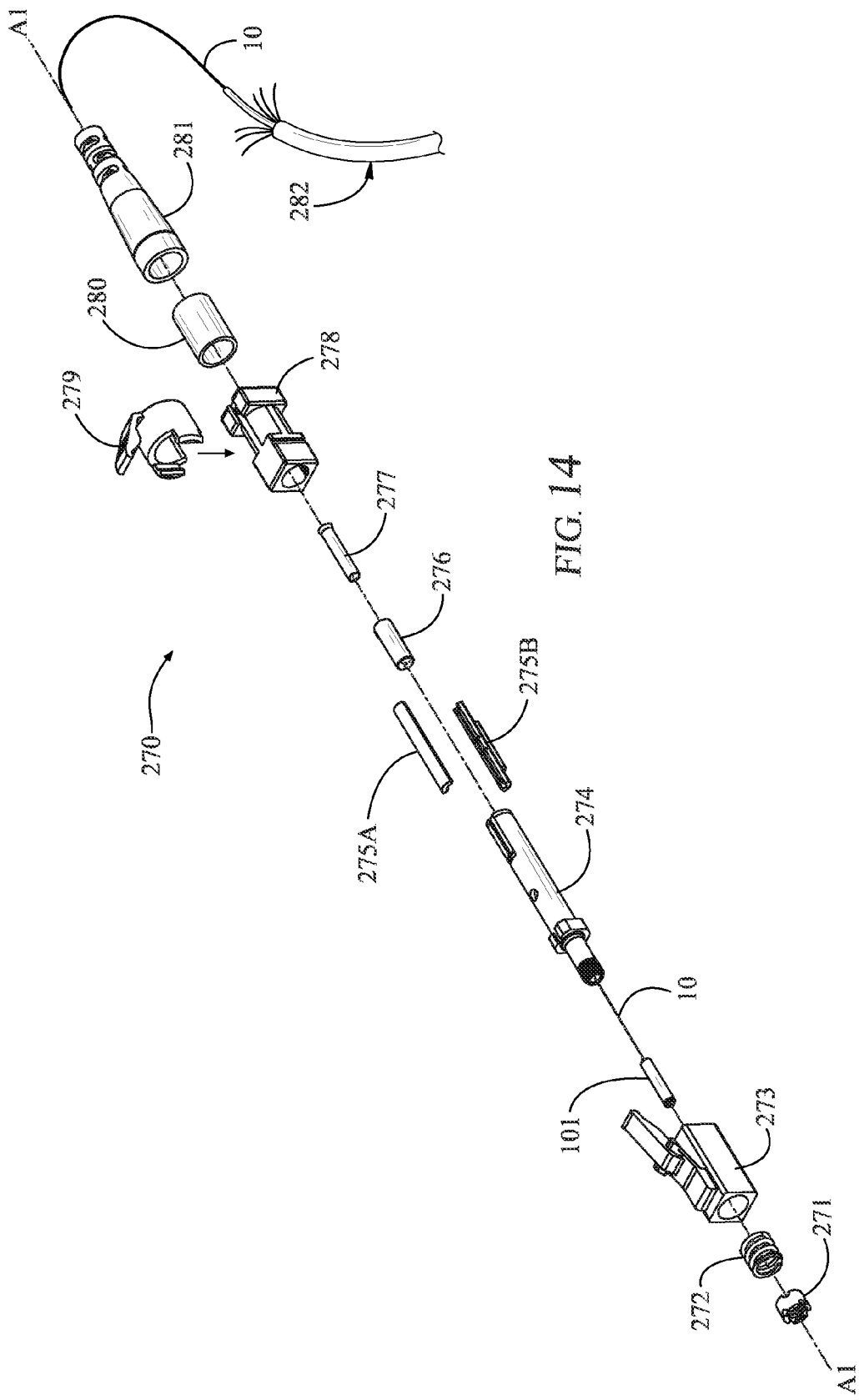
FIG. 14 is an exploded view of an example single-fiber connector that includes the single-fiber ferrule assembly formed using the methods of the present invention.

In an example embodiment, single-fiber ferrule assembly 101 is incorporated into a single-fiber optical fiber connector 270, such as shown in the exploded view of FIG. 14, and that is disclosed in, for example, U.S. Pat. Nos. 4,923,274 and 7,104,702, which patents are incorporated by reference herein. Example connector 270 includes, in order along axis A1 from the front to the back of the connector: a spring retainer 271, a spring 272, a connector housing 273, the single-fiber ferrule assembly 101, a ferrule holder 274, splice members 275A and 275B, a lead-in tube 276, a crimp tube 277, a cam member 278 and trigger member 279, a crimp band 280, a boot 281, and an optical fiber cable 282 that carries optical fiber 10.

Multi-Fiber Embodiments

Figure 15:
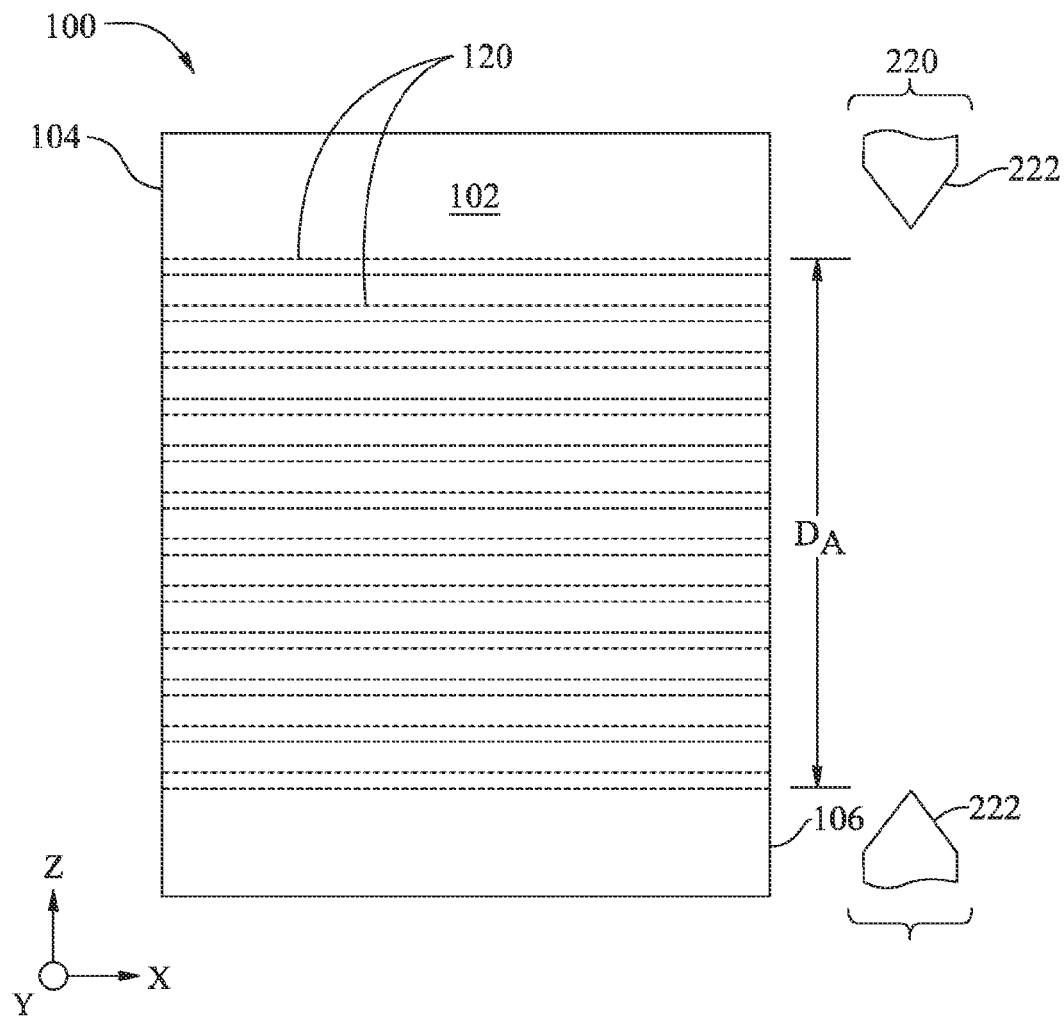
FIG. 15 is a schematic plan view of a generalized multifiber ferrule as described above in connection with the MTP-type ferrule of FIG. 7A and FIG. 7B, shown adjacent an electrode pair.

FIG. 15 is a schematic plan view of a generalized multifiber ferrule 100 as described above in connection with the MTP-type ferrule of FIG. 7A and FIG. 7B. Cartesian X-Y-Z coordinates are shown in FIG. 15 for the sake of reference. Twelve bores 120 are shown by way of example. The twelve bores 120 span a distance $D_A$ across ferrule front end 106, and example embodiment $D_A$=2.875 mm for an MTP-type connector.

Figure 16:
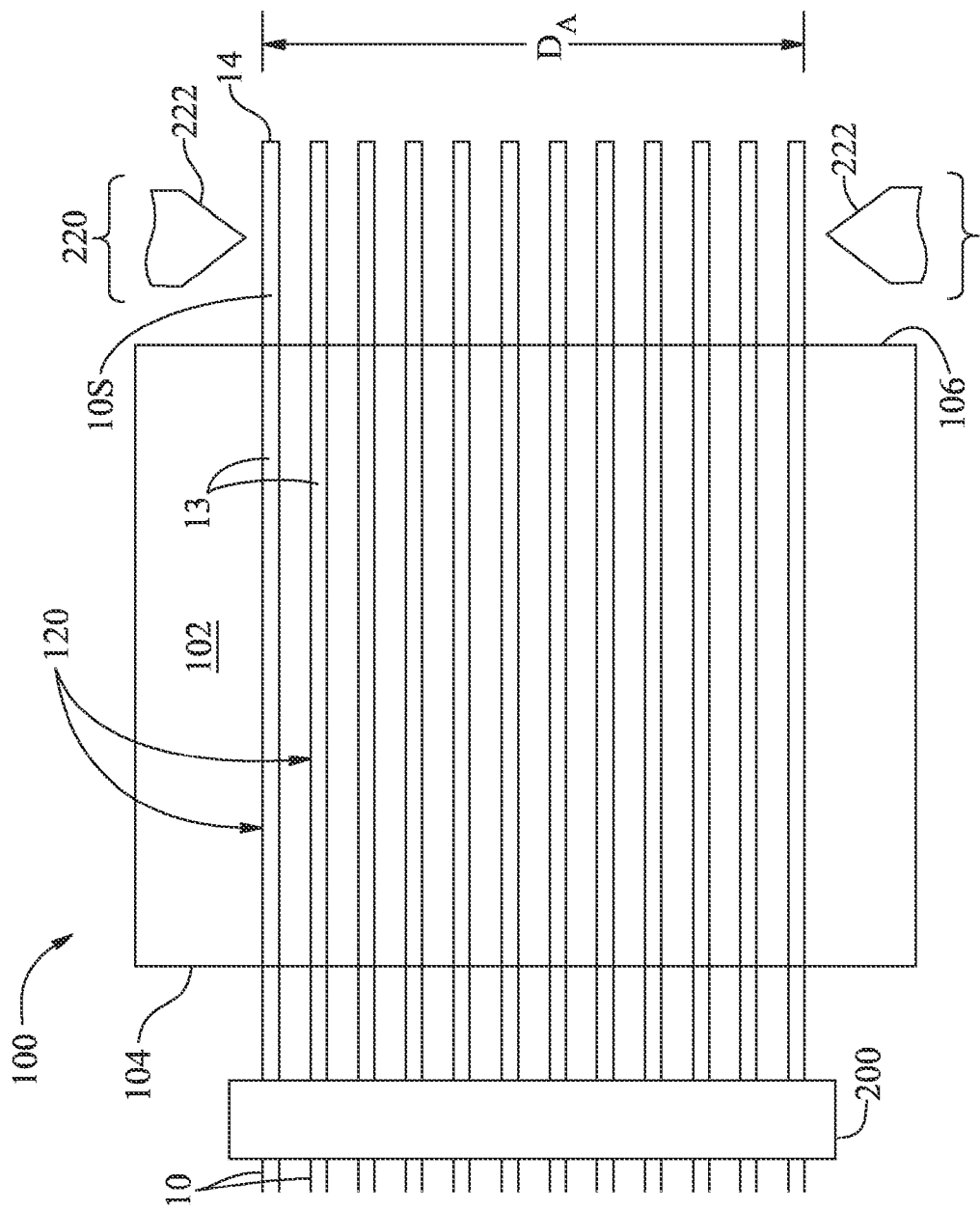
FIG. 16 is similar to FIG. 15, and shows twelve optical fibers contained in the ferrule bores and held by a fiber holder, with bare-fiber sections extending out of the ferrule front end in between the electrode pair.

FIG. 16 is similar to FIG. 15, and shows twelve optical fibers 10 contained in respective bores 120, with respective bare-fiber sections 10S extending in between electrodes 222. Optical fibers 10 are held by fiber holder 200 adjacent ferrule rear end 104. As with the single-fiber ferrule embodiment, epoxy 127 is preferably contained with bores 120 for fixing the fibers to the ferrule to complete the fiber-centering procedure. Generally, less epoxy is required for multifiber ferrules than for a single-fiber ferrule. Also, epoxy 127 can be wicked into bores 127 after the fiber-centering procedure is carried out. In this regard, it is noted that fiber bulges 250 serve to prevent epoxy 127 from leaking out of ferrule front end 106.

Figure 17:
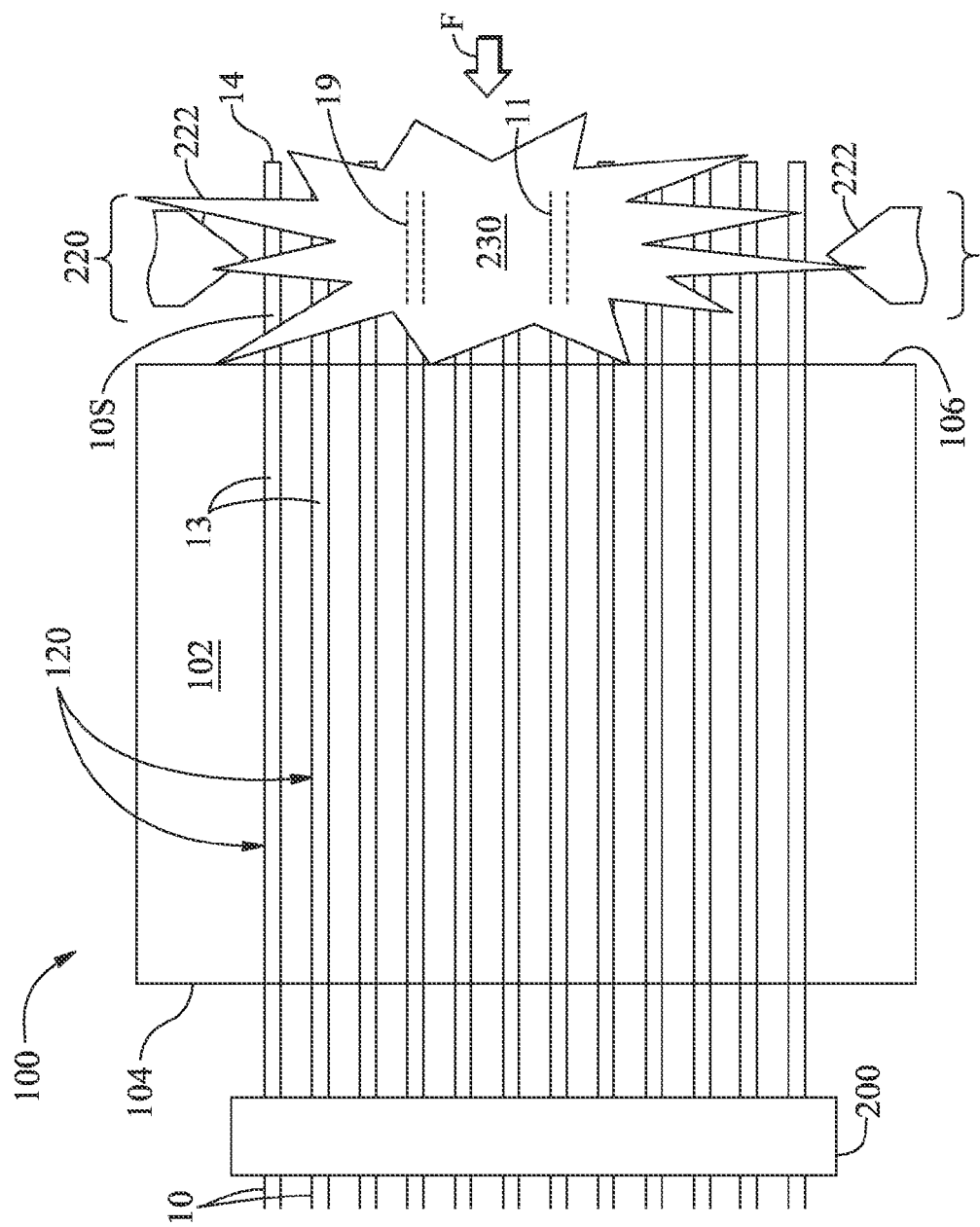
FIG. 17 is similar to FIG. 16, and illustrates the localized heating of the optical fibers via an electrical arc from the electrode pair.

With reference now to FIG. 17, a current is applied to opposing electrodes 222 so as to generate high-temperature arc 230. The energy from arc 230 acts to locally soften optical fibers 10 to form respective locally deformable regions 19, as discussed above in connection with the single-fiber embodiment (see also FIG. 11). In the case wherein one or more of optical fibers 10 are nano-engineered optical fibers, arc 230 also acts to substantially collapses voids 40 therein, thereby forming corresponding substantially void-free regions 11, at least portions of which are contained in the corresponding locally deformable regions 19. Note that in FIG. 17 the one example locally deformable region 19 is shown as being smaller than the one example substantially void-free region 11.

Figure 18A:
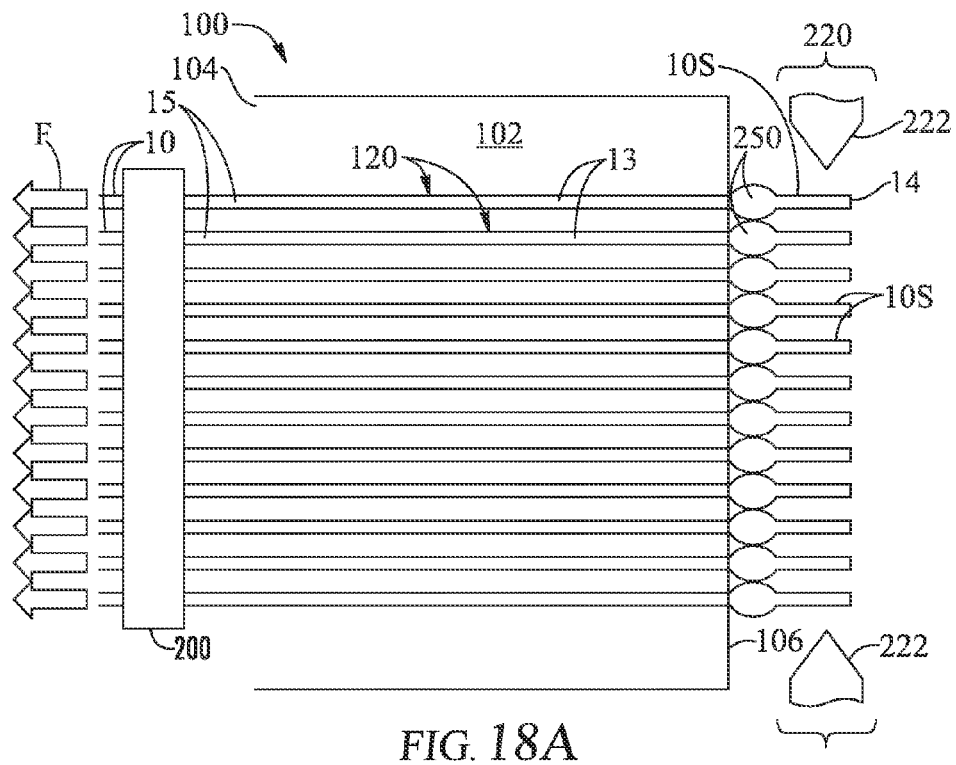
FIG. 18A is similar to FIG. 17, and illustrates the step of forming the optical fiber bulges in the locally deformable region and forming a force-fit of the fibers at the front ends of the ferrule bores.

If a small amount of an axial force F is applied to optical fiber 10, such as a small amount of pressure ("pushing") applied to fiber ends 14 and directed towards ferrule 100 during the arcing process (or within a sufficiently short time thereafter), the locally deformable regions 19 deform to form respective bulges 250 for each fiber 10, as illustrated in FIG. 18A. Bulges 250 form a force fit to bores 120 at front ferrule end 106, similar to the single-fiber ferrule embodiment as shown in FIG. 10 and the close-up view of FIG. 11. Another example of applying an axial force F is to pull optical fibers 10 the −X direction. Also, as discussed above for the single-fiber embodiment, surface tension effects alone may be used to form bulges 250.

Bulges 250 also cause optical fiber 10 to be substantially centered in bores 120 so that the respective optical fiber centerlines 16 are substantially aligned with the respective bore central axes Ac. Furthermore, bulges 250 serve to tack optical fibers 10 within bores 120 and prevent the optical fibers from being pulled out of ferrule 100.

As with the single-fiber ferrule embodiment, arc 230 is preferably positioned close enough to front ferrule end 106 as to not damage ferrule 100 but to still provide enough heat to substantially collapse voids 40 for nano-engineered optical fibers 10. In example embodiment, enough heat is generated by arc 230 to soften optical fibers 10 so that substantially void-free regions 11 extend into respective ferrule bores 120 by at least a small amount $D_{AF}$, in the same manner as discussed above and shown in FIG. 11 for the single-fiber ferrule embodiment.

Also as in the single-fiber ferrule example, in this multifiber ferrule embodiment, in an example embodiment electrode pair 220 is part of a fusion splicer configured to provide a select amount of current for a select duration. A suitable fusion splicer for use in carrying out the method of the present invention is, for example, the Corning miniMASS® Fusion Splicer, available from Corning Cable Systems, Inc., Hickory, N.C.

While localized heating of optical fibers 10 is described above using an electric arc 230, the localized heating may be generated in various ways including using other means for generating energy, such as a heated filament, a flame or a laser, among others.

Once optical fibers 10 are force-fitted into bores 120, the optical fibers are bonded to ferrule body 102, e.g., by applying heat H to the heat-activated epoxy 127 contained in bores 120, as shown in the single-fiber example of FIG. 5. In an example embodiment, bulges 250 are first formed far enough from the ferrule front end 106 so that the preinstalled epoxy 127 is not substantially affected, and then the bulges moved (e.g., "pulled" or "pushed") into bores 120 at ferrule front end 106.

Figure 18B:
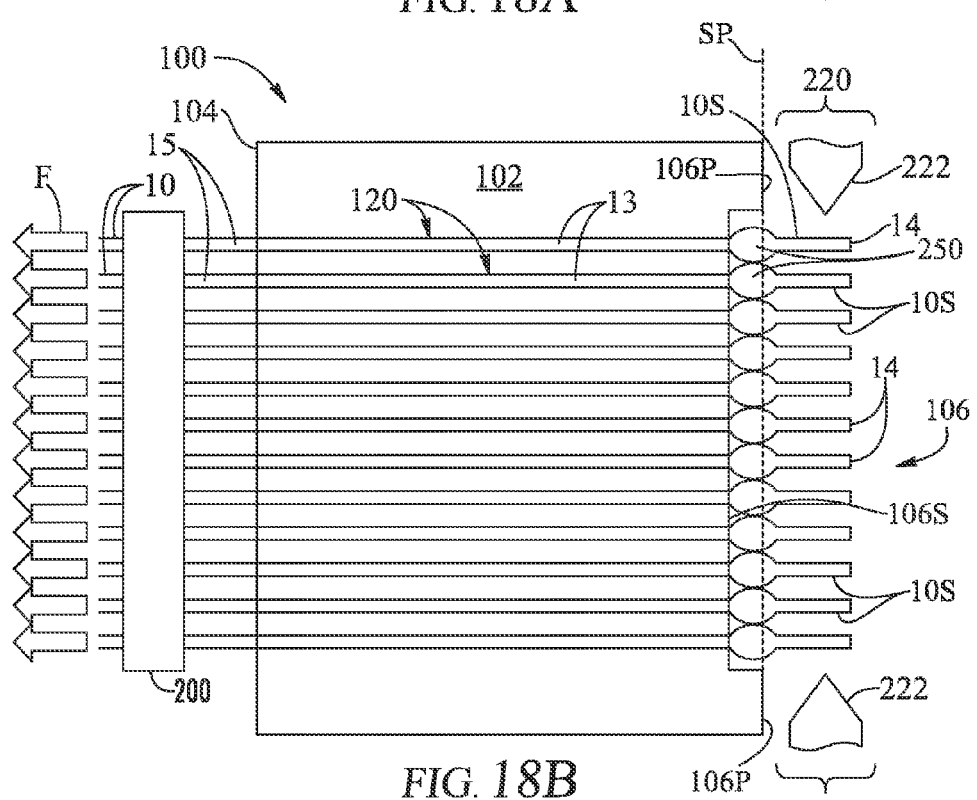
FIG. 18B is similar to FIG. 18A, and illustrates an example embodiment wherein a "long-short" multifiber ferrule is used.

FIG. 18B is similar to FIG. 18A, but illustrates an example embodiment where multifiber ferrule 100 is an LS-type ferrule.

Figure 19:
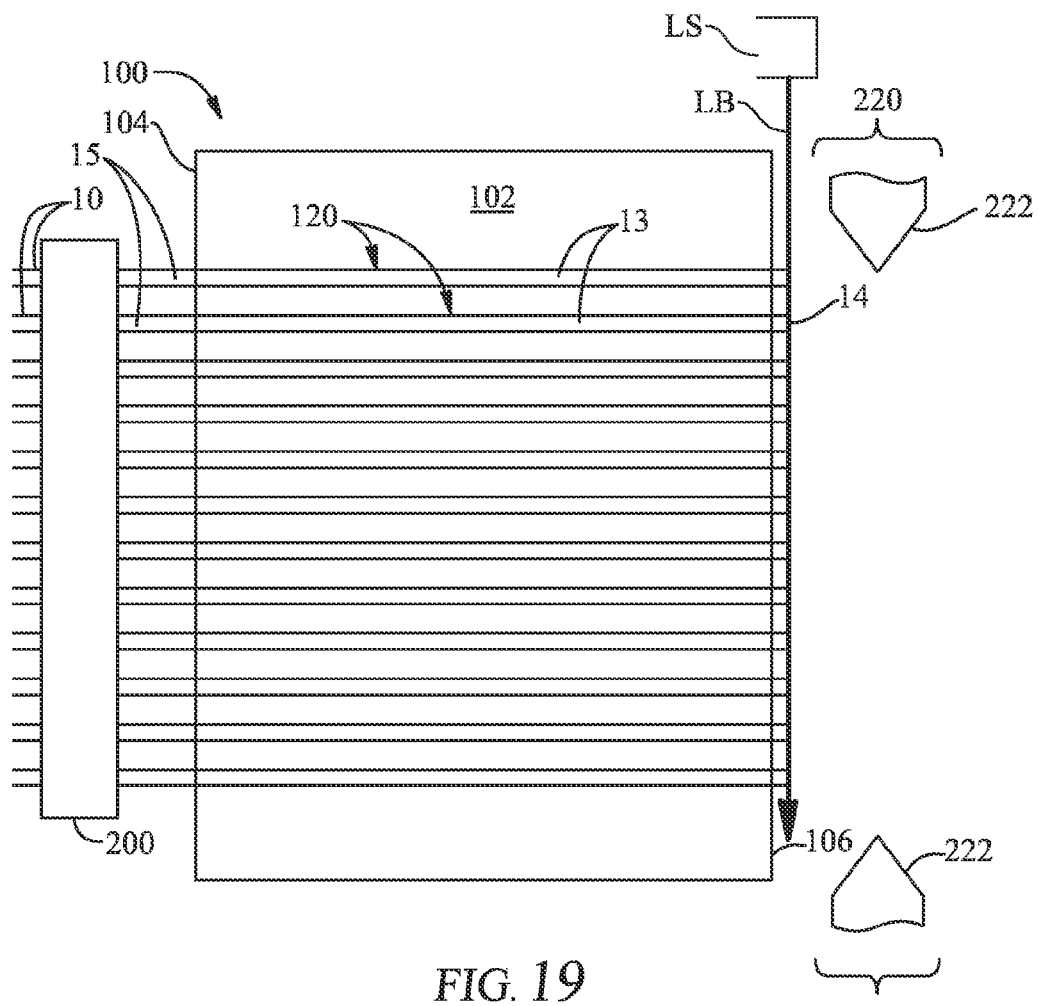
FIG. 19 is similar to FIG. 18A, illustrating the laser processing of the fiber ends.
Figure 20:
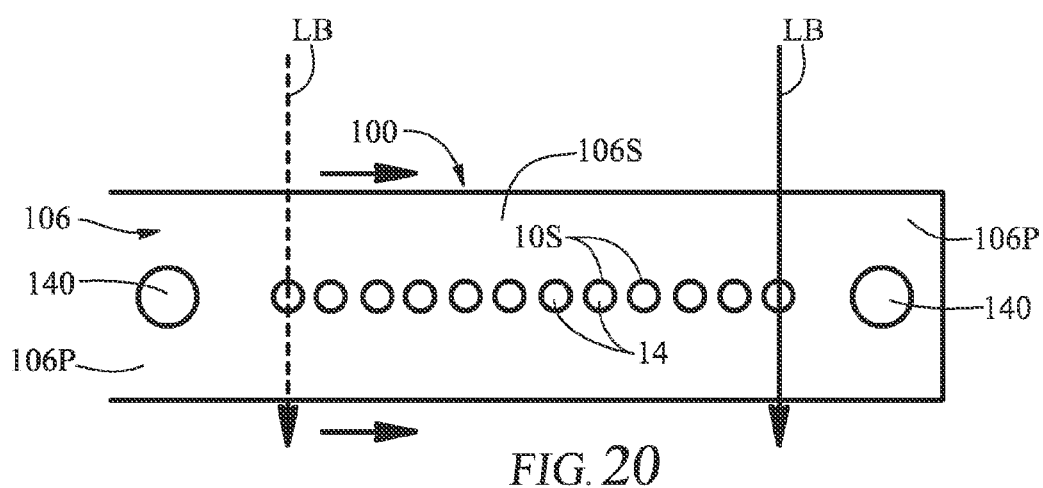
FIG. 20 is an front end-on view of a "long-short" multifiber ferrule, illustrating the laser processing of the fiber ends by scanning the laser beam across the ferrule front end.

With reference now to FIG. 19 and FIG. 20, at this point fiber sections 10S that extend from ferrule front end 106 are cut (e.g., precision-cleaved) at or close to the ferrule front end and are then polished so that resulting fiber ends 14 substantially coincide with the ferrule front end. These cutting and polishing steps can be performed, for example, either with a laser beam LB from a laser source LS as shown in FIG. 19 and FIG. 20, or with a diamond scribe and conventional mechanical polishing techniques. FIG. 20 shows laser beam LB being scanned over the ferrule front end 106 of an LS multifiber ferrule 100 (see FIG. 18B) to cleave fiber sections 10S, as discussed above in connection with FIG. 7C. Note that in the embodiment of FIG. 20, fiber ends 14 are formed substantially coincident with standoff plane SP (see FIG. 7C).

Figure 21A:
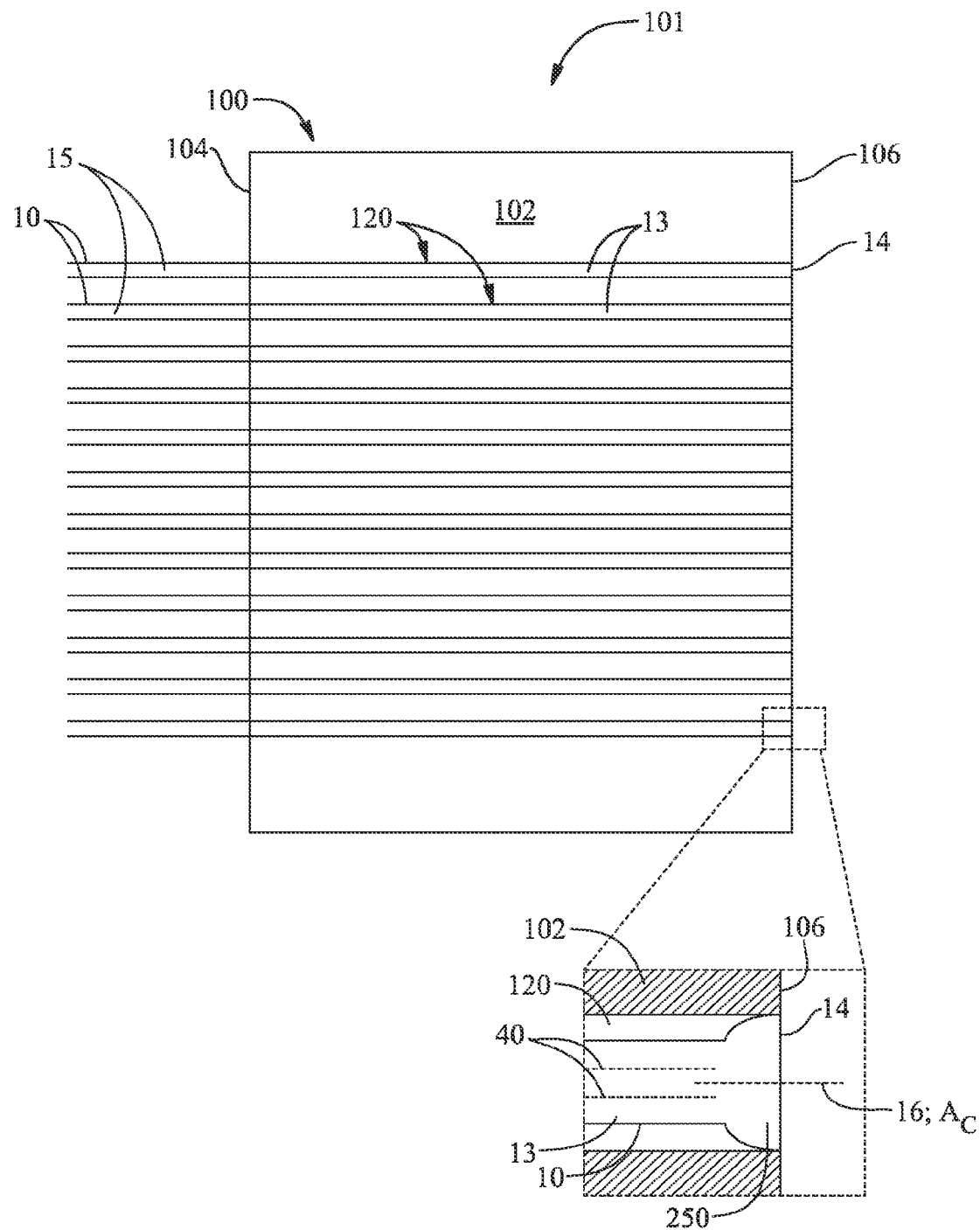
FIG. 21A is similar to FIG. 19 and shows an example finalized multifiber ferrule assembly, along with a close-up inset view of the substantially void-free fiber end in the case where nano-engineered optical fibers are used.

FIG. 21A shows an example multifiber ferrule assembly 101 wherein optical fiber ends 14 substantially coincide with ferrule end 106 (e.g., polished to be flush therewith). In the case where optical fibers 10 are nano-engineered optical fibers, fiber ends 14 have substantially no voids, as shown in the close-up inset view.

Figure 21B:
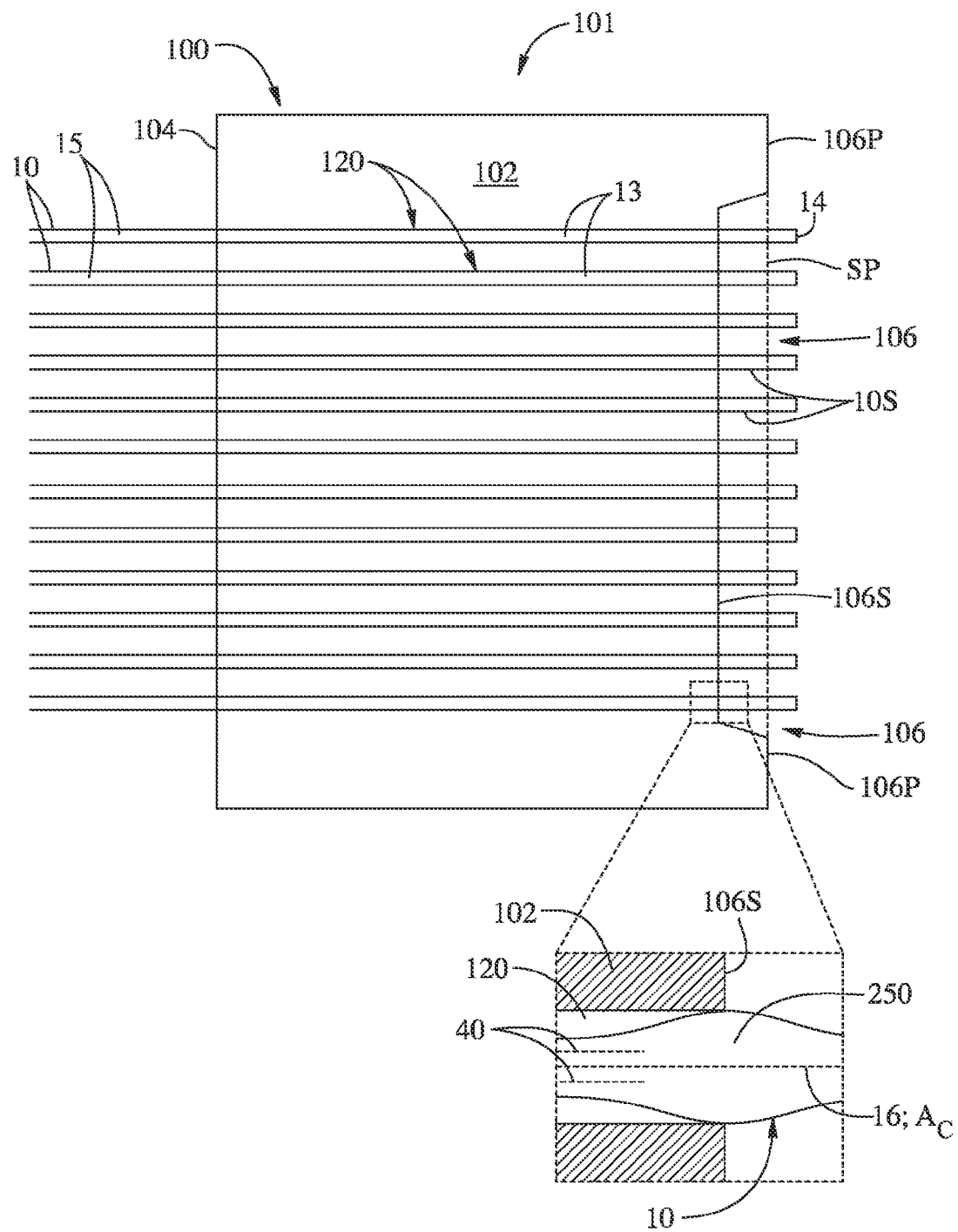
FIG. 21B is similar to FIG. 21A, and illustrates an example embodiment wherein a "long-short" multifiber ferrule is used so that the fiber ends substantially coincide with the standoff plane.

FIG. 21B is similar to FIG. 21A, but illustrates a LS multifiber ferrule embodiment that includes "long" and "short" portions of fiber sections 10S as measured relative to surface 106S and protrusions 106P, respectively. Note that fiber ends 14 are substantially coincident with standoff plane SP.

If a heat-activated epoxy 127 is contained in bores 120 prior to inserting bare portions 13 of optical fibers 10 therein, then it is important to perform the above steps in a manner that does not prematurely heat-activate the epoxy. In an example embodiment, bulges 250 are first formed far enough from the ferrule front end 106 so that the preinstalled epoxy 127 is not substantially affected, and then the bulges moved (e.g., "pulled" or "pushed") into bores 120.

In an alternative example embodiment, epoxy 127 is added to bores 120 after heat-treating optical fiber 10 with arc 230. This is accomplished, for example, by wicking epoxy 127 into bore 120. In an example embodiment, the wicking action of epoxy 127 is assisted by heating the ferrule and/or by applying a vacuum to pull the epoxy into bore 120.

Figure 22:
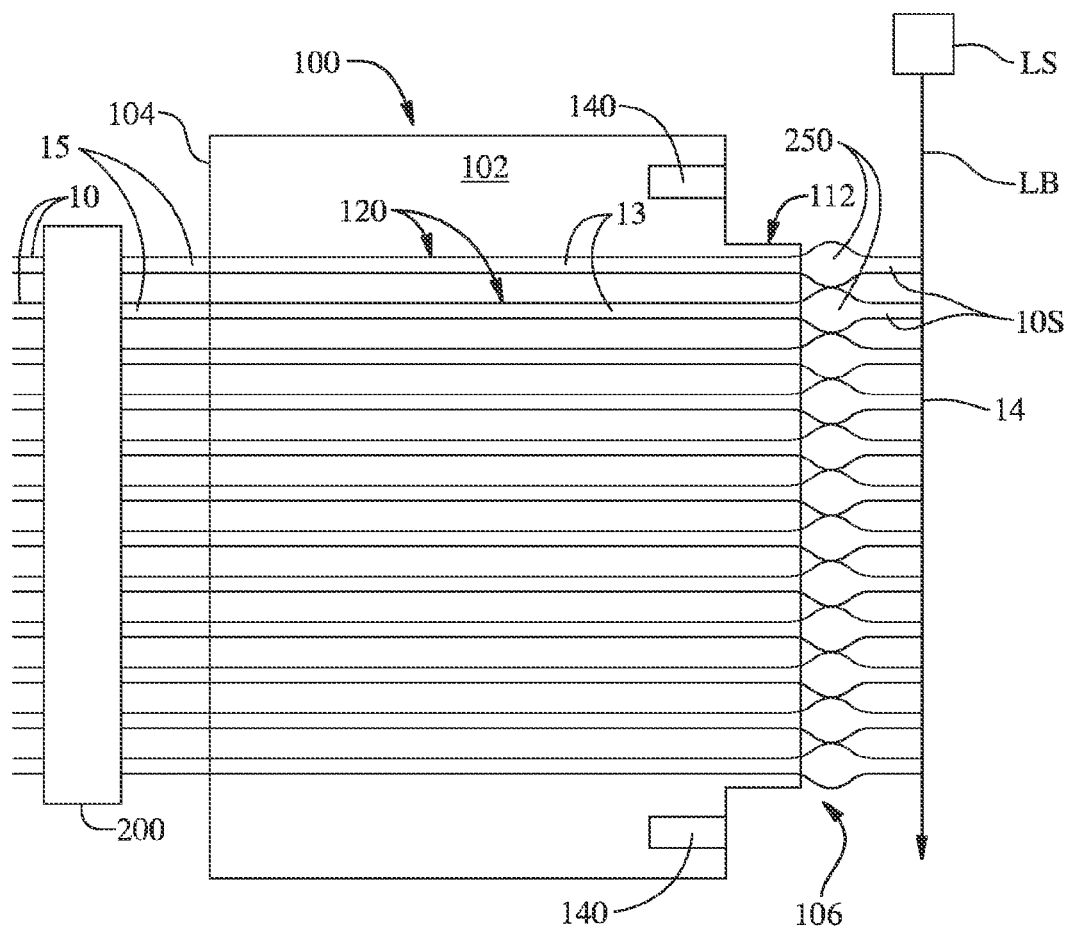
FIG. 22 is similar to FIG. 19, except that the multifiber ferrule includes a rectangular cross-section protrusion at the front end, and also shows a laser beam performing laser cleaving of the optical fiber ends on the sides of the bulges opposite the ferrule.

Another example embodiment of a method for centering standard optical fibers utilizes a two-piece multifiber ferrule 100. This example method is now described in connection with FIGS. 22 through 24. FIG. 22 is similar to FIG. 19, except that multifiber ferrule 100 includes a rectangular cross-section protrusion 112 at front ferrule end 106 that contains an end portion of bores 120. FIG. 22 also shows laser cleaving (and optionally laser polishing) being carried by out by laser beam LB on bare-fiber sections 10S next to bulges 250 but opposite ferrule front end 106 so that the bulges remain in place adjacent the front ferrule end. The laser cleaving (and optional polishing) is performed at a select distance from the ferrule front end 106, leaving shortened fiber sections 10S, as shown.

Figure 23:
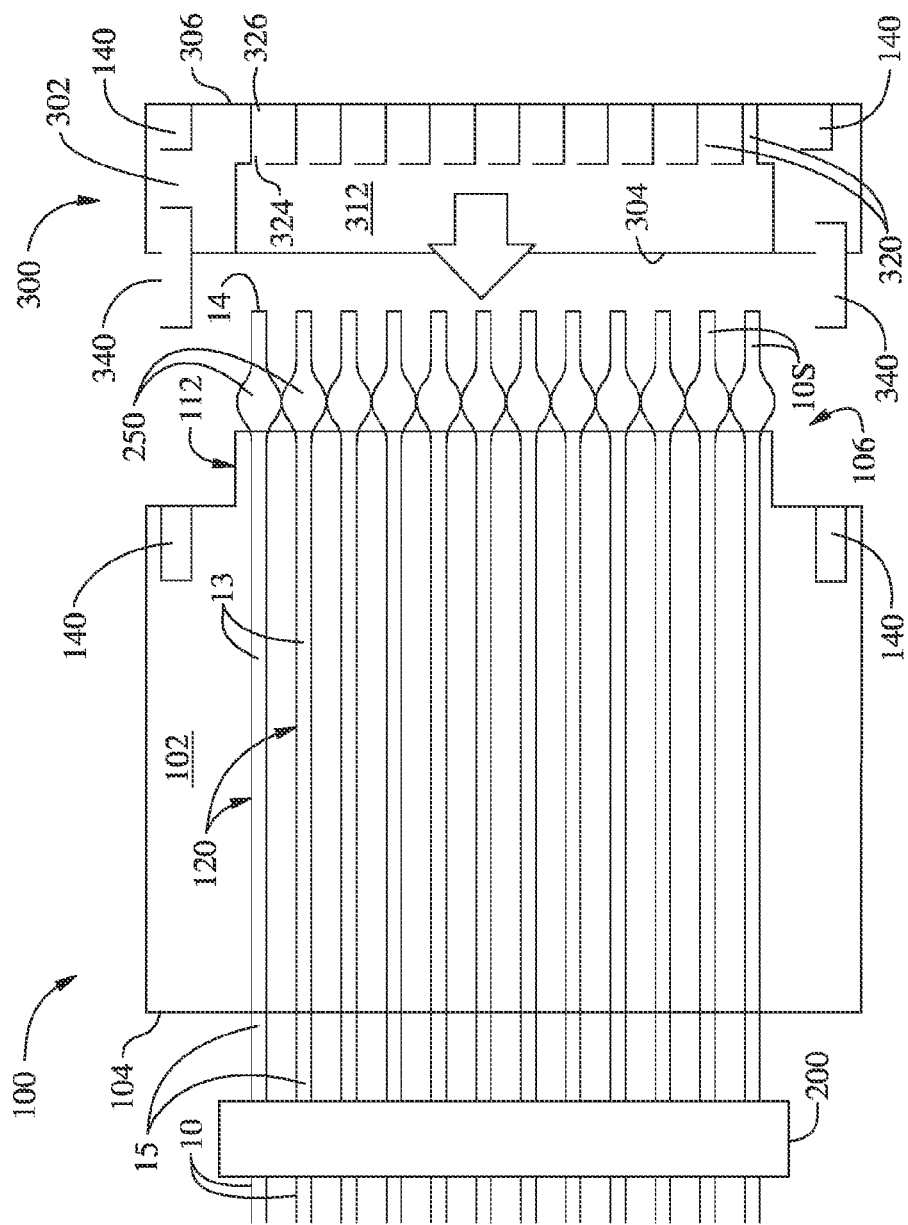
FIG. 23 is similar to FIG. 22 and shows a secondary multifiber ferrule in the process of engaging the "main" multifiber ferrule.

FIG. 23 is similar to FIG. 22, and shows a secondary multifiber ferrule 300 having a body 302, a rear end 304 and a front end 306. In this particular embodiment, multifiber ferrule 100 is referred to as the "main ferrule" and secondary multifiber ferrule 300 is referred to as the "secondary ferrule." Secondary ferrule body 302 defines a rectangular-cross-sectioned recess 312 open at rear end 304, and plurality of secondary bores 320 each having an open end 324 at recess 312 and an open end 326 to front end 306. Secondary recess 312 is configured to mate with protrusion 112 of main ferrule 100. Main ferrule 100 and secondary ferrule 300 form a two-piece multifiber ferrule.

Secondary bores 320 are arranged in a laterally extending linear row along respective secondary central axes $A_{CS}$ and correspond in size and position to bores 120 of main ferrule 100. Recess 312 is sized to accommodate bulges 250 formed in optical fibers 10. Secondary ferrule body 302 includes guide pins 340 sized and positioned on rear end 304 to mate with guide pin holes 140 at main ferrule front end 106.

Figure 24:
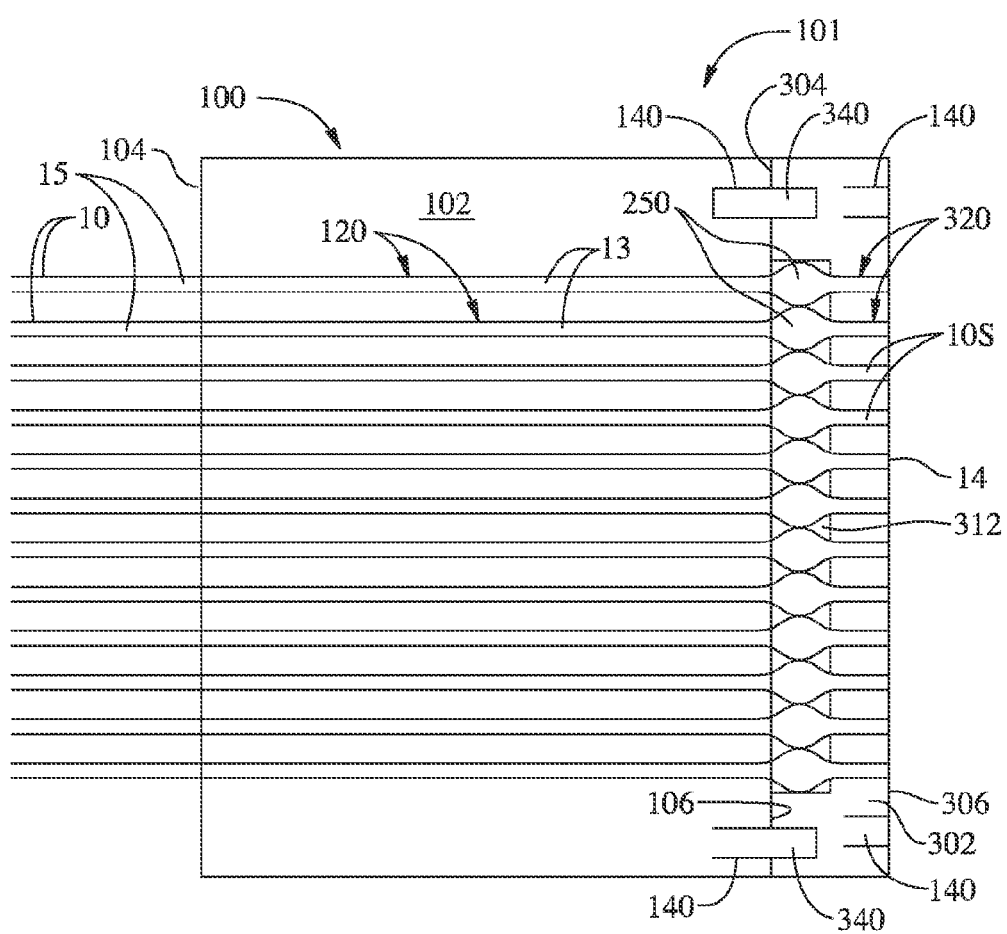
FIG. 24 is similar to FIG. 23, and shows the secondary multifiber ferrule engaged with the main multifiber ferrule so that the optical fiber ends substantially coincide with the secondary ferrule front end.

FIG. 24 is similar to FIG. 23, and shows the secondary ferrule 302 engaged with main ferrule 100 to form a multifiber ferrule assembly 101. Optical fiber sections 10S fit within bores 320 with the fiber central axes 16 substantially aligned with respective secondary bore central axes $A_{CS}$. The mating fit between recess 312 and protrusion 112 facilitates the insertion of optical fiber sections 10S into secondary bores 320 while guide pins 340 mate with guide pin holes 140 to fix secondary ferrule 300 to main ferrule 100. In this position, optical fiber ends 14 that terminate optical fiber sections 10S substantially coincide with ferrule front end 306 and are preferably flush therewith. In an example embodiment, ferrule front end 306 has a recessed portion (not shown) where optical fiber ends 14 reside.

The substantial centering of optical fibers 10 within bores 120 of main ferrule 100 results in the center lines 16 of optical fiber sections 10S being substantially aligned with the central axes $A_{CS}$ of secondary bores 320. It is also noted here that an epoxy 127 need not be used to secure optical fiber sections 10S to secondary ferrule 300. The use of secondary ferrule 10S facilitates the laser cleaving and polishing of optical fiber ends 14.

Figure 25:
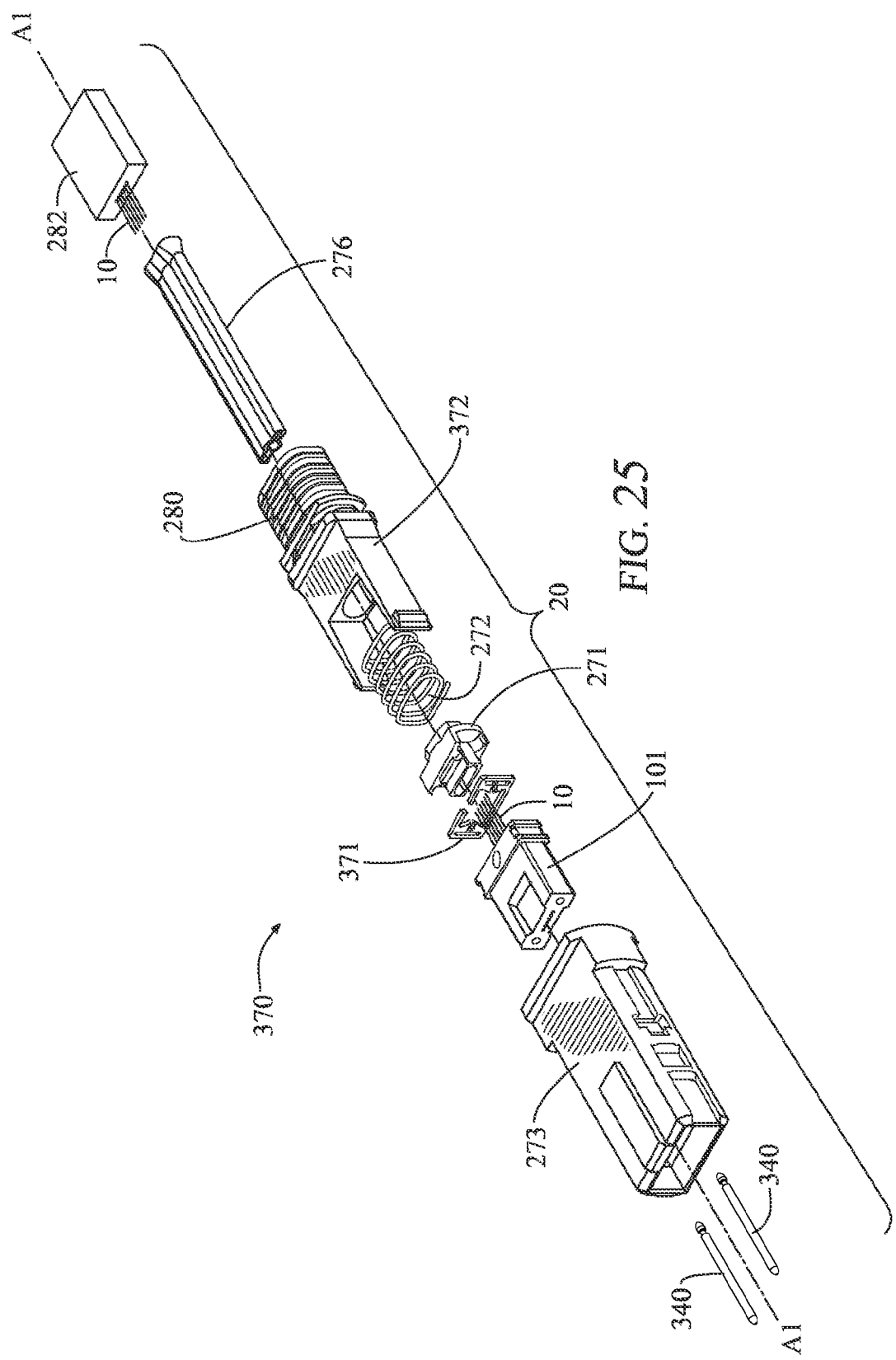
FIG. 25 is an exploded perspective view of an example multifiber connector that includes the multifiber ferrule assembly formed by the methods of the present invention.

Once optical fibers 10 are fixed within multifiber ferrule 100 as described above to form ferrule assembly 101, then in an example embodiment the multifiber ferrule assembly is incorporated into a multi-fiber optical fiber connector 370, such as shown in the exploded view of FIG. 25, and such as disclosed in U.S. Pat. Nos. 6,816,661 and 7,077,576, which patents are incorporated by reference herein. Connector 370 includes, in order along axis A1 from the front of the connector to the back: guide pins 340, a connector housing 273, multifiber ferrule assembly 101, a guide pin retainer 371, a spring seat 271, a spring 272, a spring push 372, a crimp body 280, a lead-in tube 276, and an optical fiber cable 282 that carries a plurality of optical fibers 10 (six fibers are shown for the sake of illustration).

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method of centering at least one optical fiber having a centerline and an end, within at least one bore of a connector ferrule having a front end and a central axis, wherein the at least one optical fiber comprises a nano-engineered optical fiber having a core, a cladding surrounding the core and having non-periodically disposed voids, comprising:
    inserting at least one bare-fiber portion of the at least one optical fiber into the at least one ferrule bore so that a section of the at least one bare-fiber portion extends beyond the ferrule front end;
    selectively applying an amount of energy to the at least one bare-fiber section so as to substantially collapse the voids, forming a locally deformable region, wherein the locally deformable region is substantially void free;
    forming at least one bulge in the locally deformable region; and causing the at least one bulge to form a force-fit with the at least one bore at the ferrule front end, thereby substantially centering the at least one optical fiber centerline along the at least one bore central axis.

2. The method of claim 1, further comprising after forming the at least one bulge:
    cleaving the at least one optical fiber at or near the ferrule front end.

3. The method of claim 1, further comprising after forming the at least one bulge:
    simultaneously cleaving and polishing the at least one optical fiber at or near the ferrule front end using a laser beam.

4. The method of claim 1, further comprising:
    cleaving the at least one optical fiber through the substantially void-free region.

5. The method of claim 1, wherein forming the substantially void-free region includes forming an void-free region.

6. The method of claim 1, further comprising:
    providing an epoxy in the at least one ferrule bore so as to fix the at least one optical fiber to the ferrule.

7. The method of claim 1, further comprising:
    causing the at least one optical fiber end to substantially coincide with the ferrule front end so as to form a ferrule assembly; and
    incorporating the ferrule assembly into an optical fiber connector.

8. The method of claim 1, further comprising:
    cleaving the at least one bare-fiber section;
    passing at least a portion of the at least one bare-fiber section through a second ferrule bore of a second ferrule having a second-ferrule front end so that the bare-fiber section end substantially coincides with the second-ferrule front end.

9. The method according to claim 1, wherein the energy is supplied from at least one of a fusion splicer, a flame, a filament, and a laser.

10. The method of claim 1, further comprising:
    a plurality of ferrule bores; and
    arranging a plurality of optical fibers one in each ferrule bore.

11. The method of claim 10, further comprising:
    employing a long-short connector ferrule that includes at the front end a front surface and at least one protrusion that forms a standoff from the front surface.

12. The method of claim 1, wherein the at least one optical fiber has a nominal diameter $D_{10}$, the at least one bore has a diameter $D_B$, and wherein the at least one fiber bulge represents an increase $\Delta D_{10}$ in the optical fiber diameter in a range defined by $0.8\% \leq \Delta D_{10} \leq 20\%$.

13. The method of claim 1, wherein forming the at least one bulge further comprises:
    allowing surface tension in the at least one optical fiber to form the corresponding at least one bulge in the deformable region.

14. The method of claim 1, wherein forming the at least one bulge further comprises:
    subjecting the at least one fiber to an axial force while the locally deformable region remains deformable.

15. A method of centering at least one nano-engineered optical fiber within a connector ferrule having a front end and at least one bore with a central axis, wherein the at least one nano-engineered optical fiber has a core, a cladding with non-periodically disposed voids surrounding the core, the method comprising:
    inserting at least one bare-fiber portion of the at least one optical fiber into the at least one ferrule bore so that at least a section of the at least one bare-fiber portion extends beyond the ferrule front end;
    selectively heating the at least one bare-fiber section, thereby forming a locally deformable region and substantially collapsing the voids at least within the locally deformable region, thereby forming a substantially void-free region; and
    forming at least one bulge in the locally deformable region and force-fitting the at least one bulge with the at least one bore at the ferrule front end, thereby substantially centering the at least one optical fiber centerline along the at least one bore central axis.

16. The method of claim 15, further comprising:
    forming within the substantially void-free region a substantially void-free fiber end that substantially coincides with the ferrule front end so as to form a ferrule assembly.

17. The method of claim 15, further comprising:
incorporating the ferrule assembly into an optical fiber connector.

18. The method of claim 15, wherein the connector ferrule is a multifiber ferrule, and further comprising:
centering a plurality of nano-engineered optical fibers within a corresponding plurality of ferrule bores.

19. The method of claim 18, wherein the multifiber ferrule front end has a front surface and at least one protrusion that forms a standoff from the front surface, the method further comprising:
simultaneously cleaving and polishing the plurality of nano-engineered optical fibers at respective substantially void-free regions so as to form respective substantially void-free fiber ends that substantially coincide with a standoff plane defined by the at least one protrusion.

20. The method of claim 15, further comprising:
holding the at least one optical fiber in an optical fiber holder after inserting at least one bare-fiber portion into the at least one ferrule bore.

21. A method of centering at least one optical fiber having a centerline in a connector ferrule having at least one bore with a central axis, wherein the at least one optical fiber comprises at least one nano-engineered optical fiber having voids formed therein, comprising:
inserting at least one bare-fiber portion of the at least one optical fiber into the at least one connector ferrule bore so that a section of the at least one bare-fiber portion extends beyond a front end of the ferrule;
locally heating a region of the at least one bare-fiber section thereby forming at least one locally deformable region;
substantially collapsing the voids during said local heating so as to form at least one substantially void-free region at least within the at least one locally deformable region;
forming a bulge in the at least one locally deformable region;
force-fitting the bulge into the front end of the at least one ferrule bore so that the optical fiber centerline is substantially aligned with the bore central axis; and
cleaving the at least one bare-fiber section, wherein cleaving the bare-fiber section is performed within the substantially void-free region, thereby forming at least one substantially void-free fiber end.

22. The method of claim 21, further comprising centering a single optical fiber in a single-fiber connector ferrule having a single bore.

23. The method of claim 21, further comprising centering multiple optical fibers in a multifiber connector ferrule having multiple bores.

24. The method of claim 21, further comprising:
performing said cleaving at a select distance from the ferrule front end;
passing at least a portion of the at least one cleaved bare-fiber section through at least one second ferrule bore of a second ferrule having a second-ferrule front end so that the at least one bare-fiber section cleaved end substantially coincides with the second-ferrule front end.

25. The method of claim 21, further comprising performing said cleaving using a laser beam.

* * * * *